US005565996A

United States Patent [19]

Ueda

[11] Patent Number: 5,565,996
[45] Date of Patent: Oct. 15, 1996

[54] VIDEO/AUDIO COMPRESSING DEVICE AND REPRODUCING DEVICE CAPABLE OF PREVENTING DETERIORATION OF VIDEO WITH SYNCHRONIZATION BETWEEN VIDEO AND AUDIO

[75] Inventor: Hiroaki Ueda, Tokyo, Japan

[73] Assignee: NEC Corporation, Tokyo, Japan

[21] Appl. No.: 289,586

[22] Filed: Aug. 15, 1994

[30] Foreign Application Priority Data

Aug. 13, 1993 [JP] Japan .................................. 5-201541

[51] Int. Cl.⁶ ............................................. H04N 9/79
[52] U.S. Cl. ............................................ 386/1; 386/98
[58] Field of Search ................................ 348/343, 384, 348/427, 484, 489, 642; 358/310, 322, 330, 342; 360/32; H04N 5/76, 5/92

[56] References Cited

U.S. PATENT DOCUMENTS

| | | |
|---|---|---|
| 4,679,077 | 7/1987 | Yuasa et al. . |
| 4,907,087 | 3/1990 | Schreiber ................................. 348/642 |
| 5,012,352 | 4/1991 | Yoshimura et al. ..................... 358/343 |
| 5,101,274 | 3/1992 | Yoshimura et al. ..................... 348/484 |
| 5,113,242 | 5/1992 | Tsinberg et al. ........................ 348/489 |
| 5,122,873 | 6/1992 | Golin ....................................... 348/384 |
| 5,136,391 | 8/1992 | Minami .................................... 360/32 |
| 5,247,397 | 9/1993 | Sato et al. ............................... 360/32 |
| 5,253,122 | 10/1993 | Chiba et al. ............................ 358/330 |
| 5,347,406 | 9/1994 | Chiba et al. ............................ 358/330 |
| 5,365,380 | 11/1994 | Tanaka .................................... 360/32 |

FOREIGN PATENT DOCUMENTS 61-274480 12/1986 Japan .
63-117290 5/1988 Japan .

Primary Examiner—Thai Q. Tran
Attorney, Agent, or Firm—Foley & Lardner

[57] ABSTRACT

In video/audio compression, a video signal is separated into luminance and a color difference. The color difference is partially subsampled. An interframe difference is compression-coded by an encoding unit. At that time, particular subsampling information corresponding to a designated reproducing rate is extracted from subsampling information. The particular subsampling information is inserted into compressed video data. On the other hand, in video/audio reproduction, the color difference of the video, which has partially been subsampled, are interpolated by a decoding unit with reference to the subsampling information inserted into the compressed video data.

12 Claims, 27 Drawing Sheets

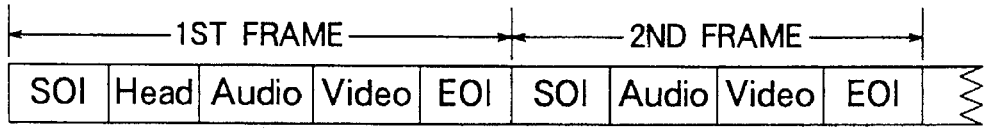

| SOI | Head | Audio | Video | EOI | SOI | Audio | Video | EOI |

|←——1ST FRAME——→|←——2ND FRAME——→|

(1) SOI   : CODE REPRESENTATIVE OF START OF FRAME
(2) Head  : HEADER PORTION OF COMPRESSED CODE
(3) Audio : COMPRESSED AUDIO CODE
(4) Video : COMPRESSED VIDEO CODE
(5) EOI   : CODE REPRESENTATIVE OF END OF ERAME

FIG. 4 (A)

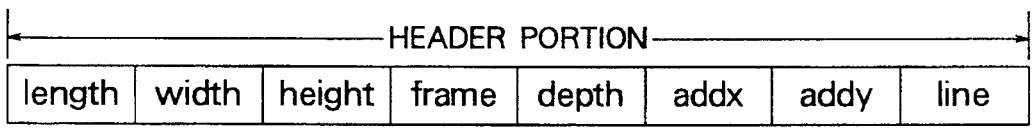

(1) length : SIZE OF HEADER PORTION
(2) width  : HORIZONTAL SIZE OF VIDEO
(3) height : VERTICAL SIZE OF VIDEO
(4) frame  : NUMBER OF FRAME
(5) depth  : NUMBER OF COLOR DIFFERENCE EFFECTIVE BITS
(6) addx   : COLOR DIFFERENCE HORIZONTAL ADDITION VALUE
(7) addy   : COLOR DIFFERENCE VERTICAL ADDITION VALUE
(7) line   : COLOR DIFFERENCE LINE SUBSAMPLING NUMBER

FIG. 4 (B)

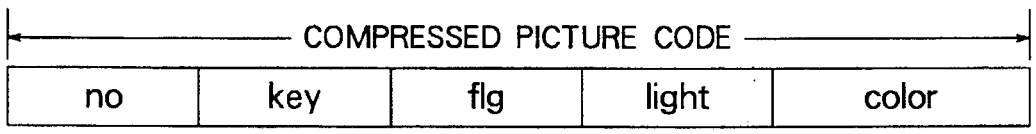

(1) no    : FRAME NUMBER
(2) key   : KEY FRAME FLAG (1 INDICATES KEY FRAME)
(3) flg   : COLOR DIFFERENCE COMPRESSION PROCESS FLAG
            (1 INDICATES PRESENCE OF COLOR DIFFERENCE COMPRESSED CODE)
(4) light : LUMINANCE COMPRESSED CODE PORTION
(5) color : COLOR DIFFERENCE COMPRESSED CODE PORTION
            (PRESENT ONLY WHEN flg=1)

FIG. 4 (C)

| NUMBER OF PICTURE ELEMENTS LESS THAN 19200 | | | | | NUMBER OF PICTURE ELEMENTS 19200-38399 | | | | |
|---|---|---|---|---|---|---|---|---|---|
| tbit | tadx | tady | tlin | tmax | tbit | tadx | tady | tlin | tmax |
| 8 | 1 | 1 | 1 | 256 | 8 | 2 | 2 | 1 | 128 |

| NUMBER OF PICTURE ELEMENTS 38400-57599 | | | | |
|---|---|---|---|---|
| tbit | tadx | tady | tlin | tmax |
| 4 | 2 | 2 | 2 | 64 |

(1) t b i t : NUMBER OF COLOR DIFFERENCE EFFECTIVE BITS (2) t b i x : COLOR DIFFERENCE HORIZONAL ADDITION VALUE (3) t a d y : COLOR DIFFERENCE VERTICAL ADDITION VALUE (4) t l i n : COLOR DIFFERENCE LINE SUBSAMPLING NUMBER (5) t m a x : MAXIMUM AVERAGE COLOR DIFFERENCE

FIG. 5

|  | 8 BITS | | | | | | | |
|---|---|---|---|---|---|---|---|---|
|  | B7 | B6 | B5 | B4 | B3 | B2 | B1 | B0 |
| 43H | 0 | 1 | 0 | 0 | 0 | 0 | 1 | 1 |

ORIGINAL VALUE (8 BITS)

FIG. 6(A)

|  | 6 BITS | | | | | |
|---|---|---|---|---|---|---|
|  | B7 | B6 | B5 | B4 | B3 | B2 |
| 10H | 0 | 1 | 0 | 0 | 0 | 0 |

VALUE AFTER REDUCING THE NUMBER OF BITS (6 BITS)

CALCULATION FORMULA : $10H = 43H \gg 2$

FIG. 6(B)

| A1 | A2 | A3 | A4 |
|---|---|---|---|
| 159 | 153 | 158 | 149 |
| A5 | A6 | A7 | A8 |
| 164 | 162 | 162 | 157 |
| A9 | A10 | A11 | A12 |
| 167 | 168 | 161 | 166 |
| A13 | A14 | A15 | A16 |
| 164 | 168 | 161 | 166 |

ORIGINAL PICTURE ELEMENTS

FIG. 7(A)

| A1 | A1 | A3 | A3 |
|---|---|---|---|
| 159 | 159 | 158 | 158 |
| A1 | A1 | A3 | A3 |
| 159 | 159 | 158 | 158 |
| A9 | A9 | A11 | A11 |
| 167 | 167 | 161 | 161 |
| A9 | A9 | A11 | A11 |
| 167 | 167 | 161 | 161 |

SUBSAMPLED PICTURE ELEMENTS

FIG. 7(B)

| A1 | A2 | A3 | A4 |
|---|---|---|---|
| 159 | 153 | 158 | 149 |
| A5 | A6 | A7 | A8 |
| 164 | 162 | 162 | 157 |
| A9 | A10 | A11 | A12 |
| 167 | 188 | 161 | 166 |
| A13 | A14 | A15 | A16 |
| 164 | 166 | 161 | 166 |

1ST FRAME

| B1 | B2 | B3 | B4 |
|---|---|---|---|
| 171 | 177 | 165 | 148 |
| B5 | B6 | B7 | B8 |
| 161 | 163 | 161 | 153 |
| B9 | B10 | B11 | B12 |
| 161 | 163 | 152 | 153 |
| B13 | B14 | B15 | B16 |
| 161 | 163 | 149 | 168 |

2ND FRAME

| C1 | C2 | C3 | C4 |
|---|---|---|---|
| 174 | 175 | 174 | 152 |
| C5 | C6 | C7 | C8 |
| 168 | 165 | 148 | 170 |
| C9 | C10 | C11 | C12 |
| 159 | 148 | 157 | 158 |
| C13 | C14 | C15 | C16 |
| 159 | 148 | 153 | 159 |

3RD FRAME

ORIGINAL PICTURE ELEMENTS

FIG. 8 (A)

| A1 | A2 | A3 | A4 |
|---|---|---|---|
| 159 | 153 | 158 | 149 |
| A5 | A6 | A7 | A8 |
| 164 | 162 | 162 | 157 |
| A9 | A10 | A11 | A12 |
| 167 | 168 | 161 | 166 |
| A13 | A14 | A15 | A16 |
| 164 | 168 | 161 | 166 |

1ST FRAME

| A1 | A2 | A3 | A4 |
|---|---|---|---|
| 159 | 153 | 168 | 149 |
| B5 | B6 | B7 | B8 |
| 161 | 163 | 161 | 153 |
| A9 | A10 | A11 | A12 |
| 167 | 188 | 161 | 166 |
| B13 | B14 | B15 | B16 |
| 161 | 163 | 149 | 168 |

2ND FRAME

| C1 | C2 | C3 | C4 |
|---|---|---|---|
| 174 | 175 | 174 | 152 |
| B5 | B6 | B7 | B8 |
| 161 | 163 | 161 | 153 |
| C9 | C10 | C11 | C12 |
| 159 | 148 | 157 | 158 |
| B13 | B14 | B15 | B16 |
| 161 | 163 | 149 | 168 |

3RD FRAME

SUBSAMPLED PICTURE ELEMENTS

FIG. 8 (B)

| A1 159 | A2 153 | A3 158 | A4 149 | | B1 171 | B2 177 | B3 165 | B4 148 | | C1 174 | C2 175 | C3 174 | C4 152 |
|---|---|---|---|---|---|---|---|---|---|---|---|---|---|
| A5 164 | A6 162 | A7 162 | A8 157 | | B5 161 | B6 163 | B7 161 | B8 153 | | C5 168 | C6 165 | C7 148 | C8 170 |
| A9 167 | A10 188 | A11 161 | A12 166 | | B9 161 | B10 163 | B11 152 | B12 153 | | C9 159 | C10 148 | C11 157 | C12 158 |
| A13 164 | A14 188 | A15 161 | A16 166 | | B13 161 | B14 163 | B15 149 | B16 188 | | C13 159 | C14 148 | C15 153 | C16 159 |

1ST FRAME     2ND FRAME     3RD FRAME
ORIGINAL PICTURE ELEMENTS

FIG. 9 (A)

| A1 159 | A2 153 | A3 158 | A4 149 | | b1 159 | b2 153 | b3 158 | b4 149 | | C1 174 | C2 175 | C3 174 | C4 152 |
|---|---|---|---|---|---|---|---|---|---|---|---|---|---|
| A5 164 | A6 162 | A7 162 | A8 157 | | b5 164 | b6 162 | b7 162 | b8 157 | | C5 168 | C6 165 | C7 148 | C8 170 |
| A9 167 | A10 168 | A11 161 | A12 166 | | b9 167 | b10 168 | b11 161 | b12 166 | | C9 159 | C10 148 | C11 157 | C12 158 |
| A13 164 | A14 168 | A15 161 | A16 166 | | b13 164 | b14 168 | b15 161 | b16 166 | | C13 159 | C14 148 | C15 153 | C16 159 |

1ST FRAME     2ND FRAME     3RD FRAME
SUBSAMPLED PICTURE ELEMENTS (WITHOUT INTERPOLATION)

CALCULATION FORMULA : $b_i = A_i$ $(i = 1 \sim 16)$

FIG. 9 (B)

| A1 159 | A2 153 | A3 158 | A4 149 | | b1 166 | b2 164 | b3 166 | b4 150 | | C1 174 | C2 175 | C3 174 | C4 152 |
|---|---|---|---|---|---|---|---|---|---|---|---|---|---|
| A5 164 | A6 162 | A7 162 | A8 157 | | b5 166 | b6 163 | b7 155 | b8 163 | | C5 168 | C6 165 | C7 148 | C8 170 |
| A9 167 | A10 168 | A11 161 | A12 166 | | b9 163 | b10 158 | b11 159 | b12 162 | | C9 159 | C10 148 | C11 157 | C12 158 |
| A13 164 | A14 168 | A15 161 | A16 166 | | b13 161 | b14 158 | b15 157 | b16 162 | | C13 159 | C14 148 | C15 153 | C16 159 |

1ST FRAME     2ND FRAME     3RD FRAME
SUBSAMPLED PICTURE ELEMENTS (WITH INTERPOLATION)

CALCULATION FORMULA : $b_i = A_i + (C_i - A_i)/2$ $(i = 1 \sim 16)$

FIG. 9 (C)

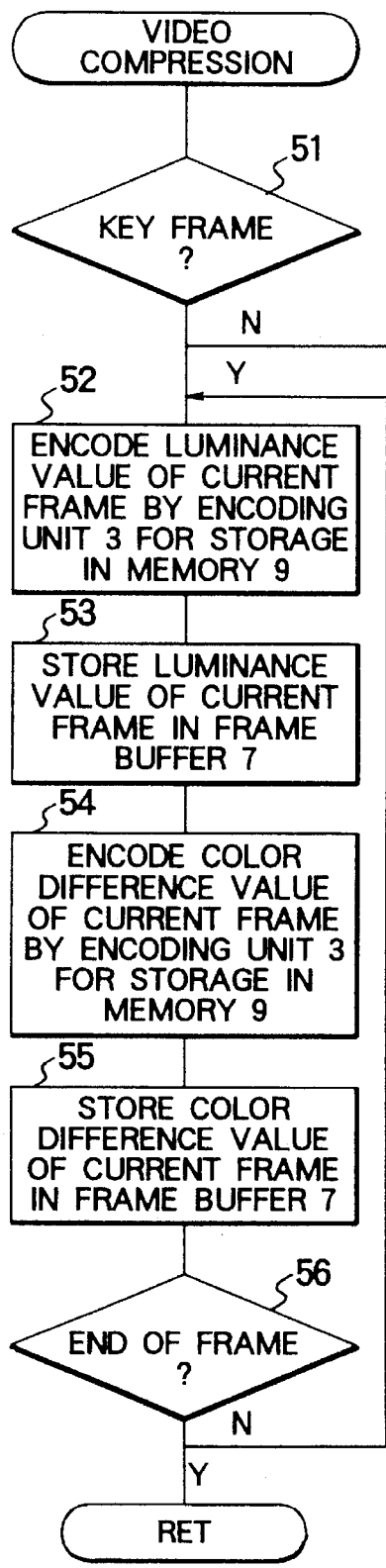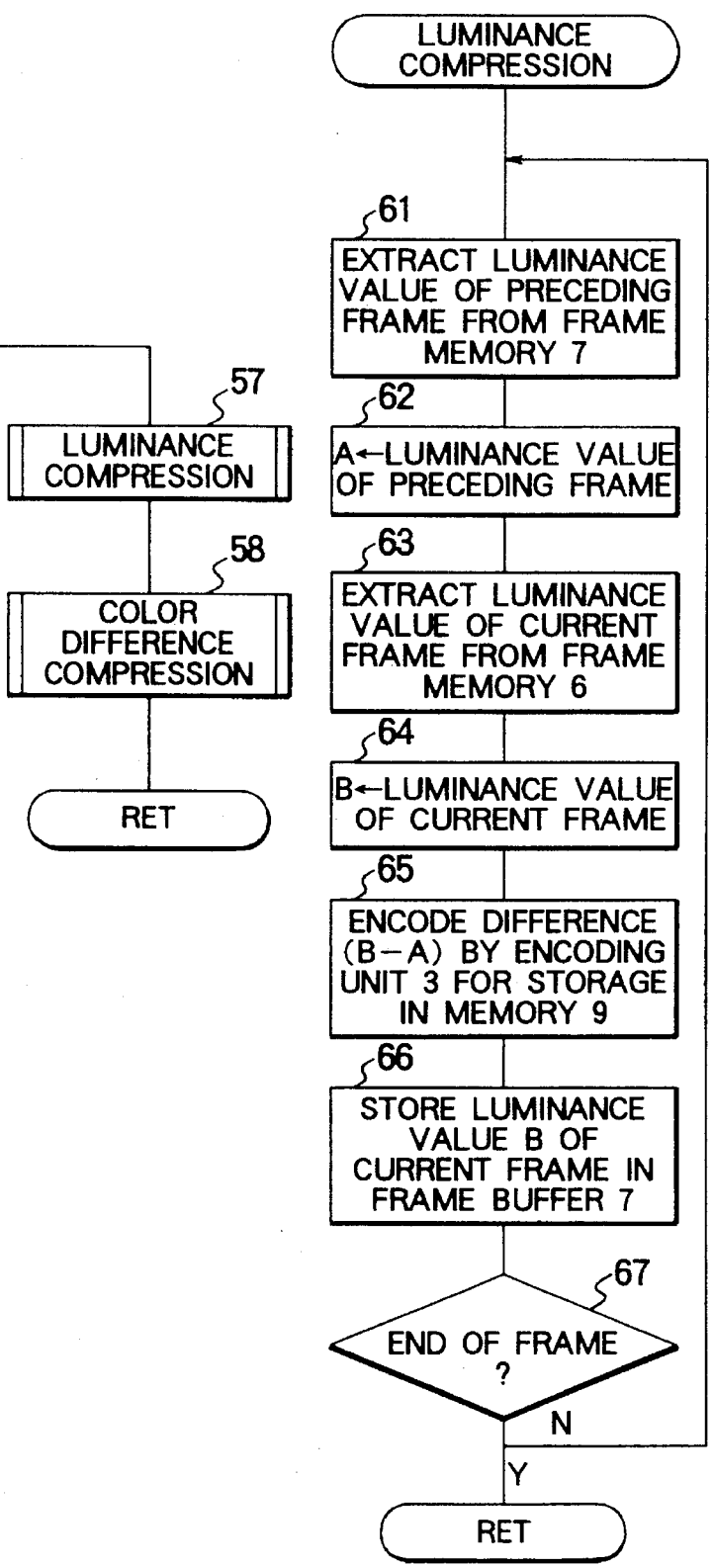
FIG. 11 (A)   FIG. 11 (B)

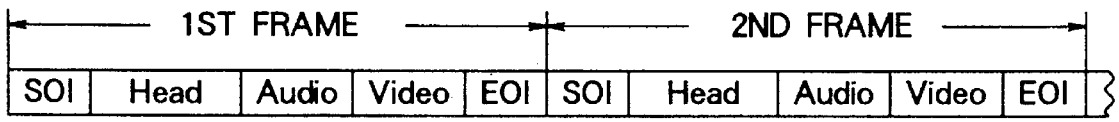

(1) SOI : CODE REPRESENTATIVE OF START OF FRAME
(2) Head : HEADER PORTION OF COMPRESSED CODE
(3) Audio : COMPRESSED AUDIO CODE
(4) Video : COMPRESSED VIDEO CODE
(5) EOI : CODE REPRESENTATIVE OF END OF FRAME

FIG. 24(A)

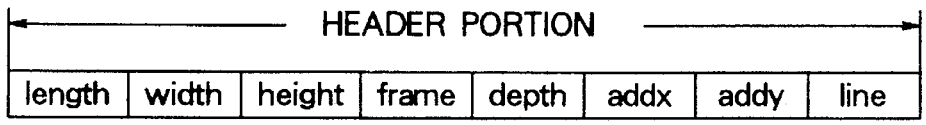

(1) length : SIZE OF HEADER PORTION
(2) width : HORIZONTAL SIZE OF VIDEO
(3) height : VERTICAL SIZE OF VIDEO
(4) frame : NUMBER OF FRAMES
(5) depth : NUMBER OF COLOR DIFFERENCE EFFECTIVE BITS
(6) addx : COLOR DIFFERENCE HORIZONTAL ADDITION VALUE
(7) addy : COLOR DIFFERENCE VERTICAL ADDITION VALUE
(8) line : COLOR DIFFERENCE LINE SUBSAMPLING NUMBER

FIG. 24(B)

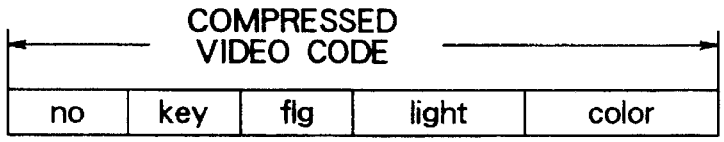

(1) no : FRAME NUMBER
(2) key : KEY FRAME FLAG (1 INDICATES KEY FRAME)
(3) flg : COLOR DIFFERENCE COMPRESSION PROCESS FLAG
       (1 INDICATES PRESENCE OF COLOR
       DIFFERENCE COMPRESSED)
(4) light : LUMINANCE COMPRESSED CODE PORTION
(5) color : COLOR DIFFERENCE COMPRESSED CODE PORTION
       (PRESENT ONLY WHEN flg = 1)

FIG. 24(C)

VIDEO/AUDIO COMPRESSING DEVICE AND REPRODUCING DEVICE CAPABLE OF PREVENTING DETERIORATION OF VIDEO WITH SYNCHRONIZATION BETWEEN VIDEO AND AUDIO

BACKGROUND OF THE INVENTION

This invention relates to a video/audio compressing device for recording a compressed video code and a compressed audio code in a recording medium such as a CD-ROM and hard disk and to a video/audio reproducing device for use in reproduction of a recorded video code and a recorded audio code.

A video/audio reproducing device reads video and audio codes recorded in a recording medium such as a CD-ROM and a hard disk and provides a reproduction on a display or a speaker. The video and the audio codes to be reproduced by the video/audio reproducing device are compression-coded and recorded by a video/audio compressing device.

An interframe difference encoding method has been widely applied to such a conventional video/audio compressing device of the type described.

In the interframe difference encoding method, a difference value is compression-coded by the use of the fact that difference values between video frames concentrate around zero. A video signal is separated into a luminance signal and a color difference signal. Differential values between picture elements of a current frame and a preceding frame are calculated and compression-coded. A plurality of frames are compressed by successively compression-coding the difference values. Since the difference value between frames my become large due to a scene change, those frames (key frames) encoding values of the picture elements, not the difference values, are inserted at a predetermined interval.

The above-mentioned system requires a device capable of editing, comprising, and recording a large amount of video and audio information at a high speed. Upon reproduction, the audio information is reproduced in combination with the video information corresponding thereto. Accordingly, the timing (synchronization) of reproduction must be adjusted. Particularly, due to the capacity of the device and the size of the compressed video code, a video recording/reproducing rate may be slower than an audio recording/reproducing rate. This results in collapse of synchronization between the video and the audio upon reproduction. In this event, an unnatural impression is given to a watcher of the display.

In order to prevent the collapse of synchronization, several attempts have been proposed. An example for establishing the synchronization is disclosed in Japanese Patent Prepublication No. 274480/1986. In this system, varied picture elements are detected and clear videos successively derived from rough videos are encoded. Thus, high-speed video compression/reproduction is attained. Another example is also disclosed in Japanese Patent Prepublication No. 117290/1988, the video is divided into a plurality of regions. Particular regions with any change alone are encoded to achieve high-speed video compression/reproduction.

Thus, in the conventional video/audio compressing device or video/audio reproducing device, the videos are partially subsampled to simplify the video processing so as to achieve high-speed video compression/video reproduction.

However, as those regions containing an increased number of varied picture elements alone are encoded, large-motion regions are properly reproduced but small-motion regions are not reproduced. As a result, it is inevitably caused to happen that the motion of a whole scene seems unnatural.

SUMMARY OF THE INVENTION

It is an object of this invention to provide a video/audio compressing device and a video/audio reproducing device wherein a plurality of kinds of parameters are prepared for a video subsampling operation in accordance with a video processing rate and the subsampling operation is carried out with reference to the parameters so as to prevent deterioration of a video with synchronization established between the video and an audio.

Other objects of this invention will become clear as the description proceeds.

On setting forth a general aspect of this invention, it is possible to understand that a video/audio compressing device is for separating a video of a current frame into luminance and color difference, compression-coding an interframe difference in said luminance and said color difference between said current frame and a preceding frame, and recording a compressed video signal and a compressed audio signal in a recording medium in synchronism with each other.

In accordance with the general aspect of this invention, the above-understood compressing device comprises: (A) subsampling information storing means for storing color difference subsampling information predetermined in dependence upon the information amount of a video signal to be processed; (B) compression information extracting means for extracting said subsampling information from said subsampling information storing means; and (C) compression-coding means for compression-coding said interframe difference by partially subsampling said color difference in accordance with said subsampling information extracted from said compression information extracting means.

On setting forth the gist of a different aspect of this invention, it is possible to recognize that a video/audio reproducing device is for use in combination with the above-understood compressing device.

In accordance with the different aspect of this invention, the above-recognized reproducing device comprises: (A) means for extracting said color difference subsampling information recorded by said video/audio compressing device from compressed video and audio codes containing said subsampling information; and (B) decoding means for decoding said compressed codes by interpolating said color difference in accordance with said subsampling information.

The above-mentioned subsampling information comprises color difference bit number subsampling information predetermined in dependence upon the information amount of a video signal to be processed.

The subsampling information may comprises color difference block subsampling information predetermined in dependence upon the information amount of a video signal to be processed.

The subsampling information may also comprise color difference line subsampling information predetermined in dependence upon the information amount of a video signal to be processed.

The above-mentioned interframe difference may be compression-coded by partially subsampling frames with reference to judgement of a difference value of the color difference between picture elements of a current frame and a preceding frame.

BRIEF DESCRIPTION OF THE DRAWING

FIG. 4(A) shows a view for illustrating a structure of a video-audio code used in the video/audio compressing and reproducing devices according to the first embodiment of this invention;

FIG. 4(B) shows a view for illustrating a structure of a header portion of the video-audio code illustrated in FIG. 4(A);

FIG. 4(C) shows a view for illustrating a structure of a compressed video code of the video-audio code illustrated in FIG. 4(A);

FIG. 5 shows a view for illustrating a structure of sub-sampling information;

FIG. 6(A) shows a view for describing a color difference bit subsampling operation, in which the number of bits is kept at an original value of 8 bits;

FIG. 6(B) shows a view for describing a color difference bit subsampling operation, in which the number of bits is turned into a value after reducing the number of bits (6 bits);

FIG. 7(A) shows a view for describing a color difference block subsampling operation, in which values of original picture elements are represented;

FIG. 7(B) shows a view for describing a color difference block subsampling operation, in which values of subsampled picture elements are represented;

FIG. 8(A) shows a view for describing a color difference line subsampling operation, in which values of original picture elements are represented;

FIG. 8(B) shows a view for describing a color difference line subsampling operation, in which values of subsampled picture elements are represented;

FIG. 9(A) shows a view for describing a color difference frame subsampling operation, in which values of original picture elements are presented;

FIG. 9(B) shows a view for describing a color difference frame subsampling operation, in which values of subsampled picture elements are represented without any interpolation;

FIG. 9(C) shows a view for describing a color difference frame subsampling operation, in which values of subsampled picture elements are represented with an interpolation;

FIG. 11(A) shows a flow chart for illustrating the operation of audio compression in the first embodiment of this invention;

FIG. 11(B) shows a flow chart for illustrating the operation of luminance compression in the first embodiment of this invention;

FIG. 24(A) shows a view for illustrating a structure of a video-audio code used in the video/audio compressing and reproducing devices according to the second embodiment of this invention;

FIG. 24(B) shows a view for illustrating a structure of a header portion of the video-audio code illustrated in FIG. 24(A);

FIG. 24(C) shows a view for illustrating a structure of a compressed video code of the video-audio code illustrated in FIG. 24(A);

DESCRIPTION OF THE PREFERRED EMBODIMENT

Figure 1:
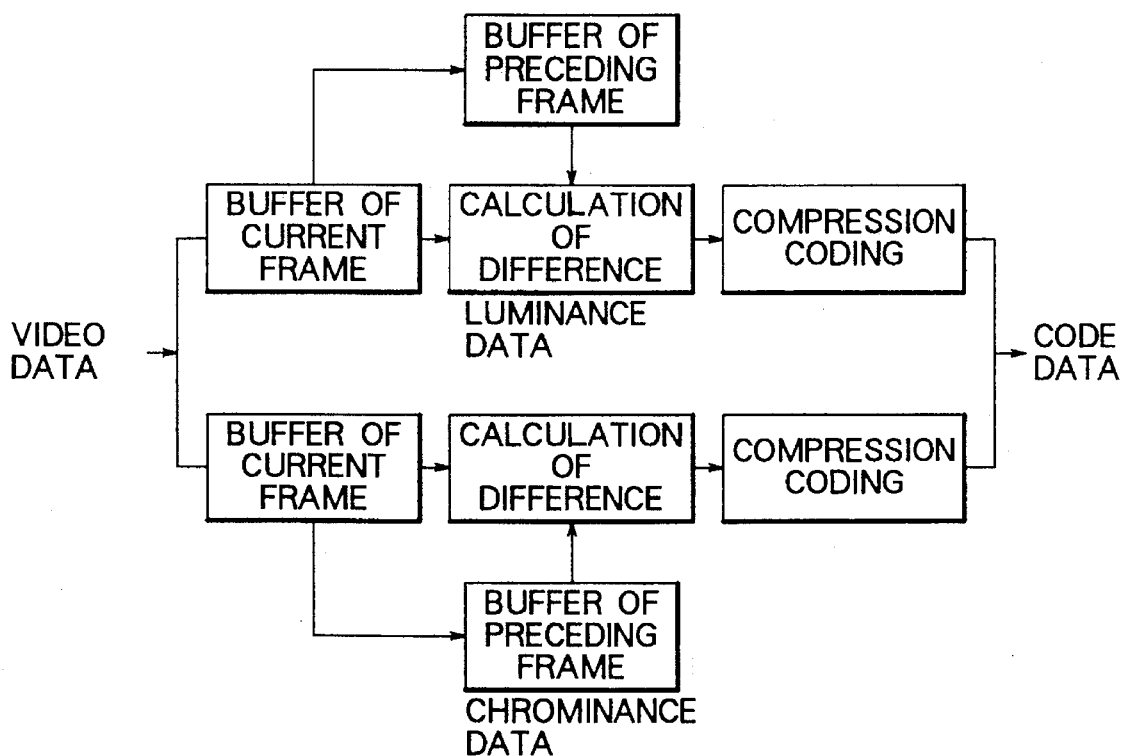
FIG. 1(A) shows a flow chart of a conventional interframe encoding system.
FIG. 1(B) shows a schematic illustration for explaining the conventional interframe encoding system illustrated in FIG. 1(A)
Figure 1:
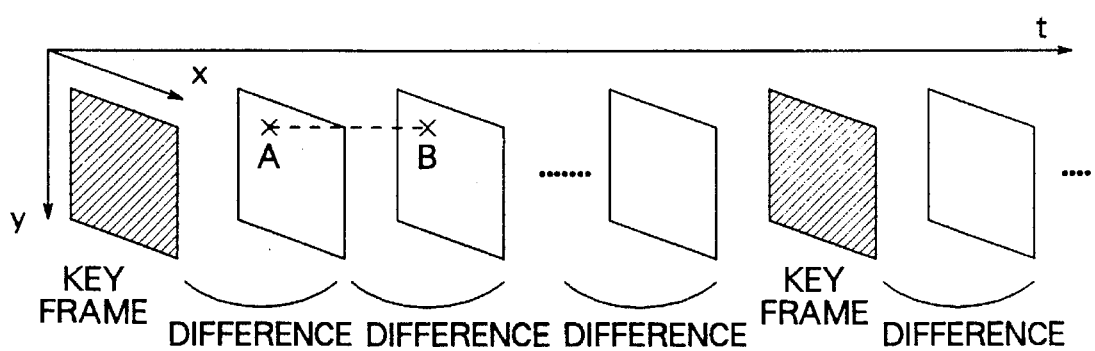

Referring to FIGS. 1(A) and (B), description will first be made as regards a video compressing device according to a conventional interframe difference encoding system for a better understanding of this invention.

As illustrated in FIG. 1(A), a video signal is separated into a luminance signal and a chrominance signal. Differential values between picture elements of a current frame and a preceding frame are calculated and compression-coded. In this event, as illustrated in FIG. 1(B), a plurality of frames are compressed by successively compression-coding the difference values. Since the difference value between frames may become large due to a scene change, those frames (key frames) encoding values of the picture elements, not the difference values, are inserted at a predetermined interval.

However, as mentioned in the preamble of the instant specification, due to the capacity of the device and the size of the compressed video code, a video recording/reproducing rate may be slower than an audio recording/reproducing rate. This causes the aforesaid collapse of synchronization between the video and the audio upon reproduction. For example, it will be assumed that a display process of a decoded video requires 5 milliseconds. In this event, a decoding process of one frame must be carried out within b out 28 milliseconds in order to process 30 frames per second. If the decoding process requires about 50 milliseconds, the audio is reproduced about 22 milliseconds earlier while the video of one frame is reproduced. Thus, synchronization between the motion video and the audio can not be established.

In view of the above, a video frame subsampling operation is carried out to establish synchronization between the video and the audio upon reproduction. In this event, synchronization is established between the motion video and the audio. However, the video is not changed during a frame subsampling period so that the motion of the video seems unnatural. For example, if four frames are subsampled in order to establish synchronization between the motion video and the audio, the video is not changed for a time duration of about 133 milliseconds.

In the conventional video/audio compressing device or video/audio reproducing device, the videos are partially subsampled to simplify the video processing so as to achieve high-speed video compression/video reproduction. Since those regions containing an increased number of varied picture elements alone are encoded, large-motion regions are properly reproduced but small-motion regions are not reproduced. As a result, the motion of a whole scene seems unnatural.

Referring now to FIGS. 2 to 22, description will proceed to video/audio compressing device and reproducing device according to a first embodiment of this invention.

The video/audio compressing device is for use in separating a video of a current frame into luminance and color difference ("color difference" may be called "chrominance"), compression-coding an interframe difference in said luminance and said color difference between said current frame and a preceding frame, and recording a compressed video signal and a compressed audio signal in a recording medium in synchronism with each other. The video/audio compressing device comprises a subsampling information memory 1, a compression information extracting unit 2, and an encoding unit 3, The subsampling information memory 1 serves as subsampling information storing means for storing color difference subsampling information predetermined in dependence upon the information amount of a video signal to be processed. On the other hand, the compression information extracting unit 2 serves as compression information extracting means for extracting the subsampling information from the subsampling information memory 1 while the encoding unit 3 serves as compression-coding means for compression-coding the interframe difference by partially subsampling the color difference in accordance with the subsampling information extracted from the compression information extracting unit 2.

The video/audio compressing device further comprises a control section 4, a hard disk 5, a frame memory 6, a frame buffer 7, and audio encoder 8, a memory 9, and a keyboard 10. The control section 4 comprises the above-mentioned compression information extracting unit 2, the encoding unit 3, and a device control unit 11.

Figure 2:
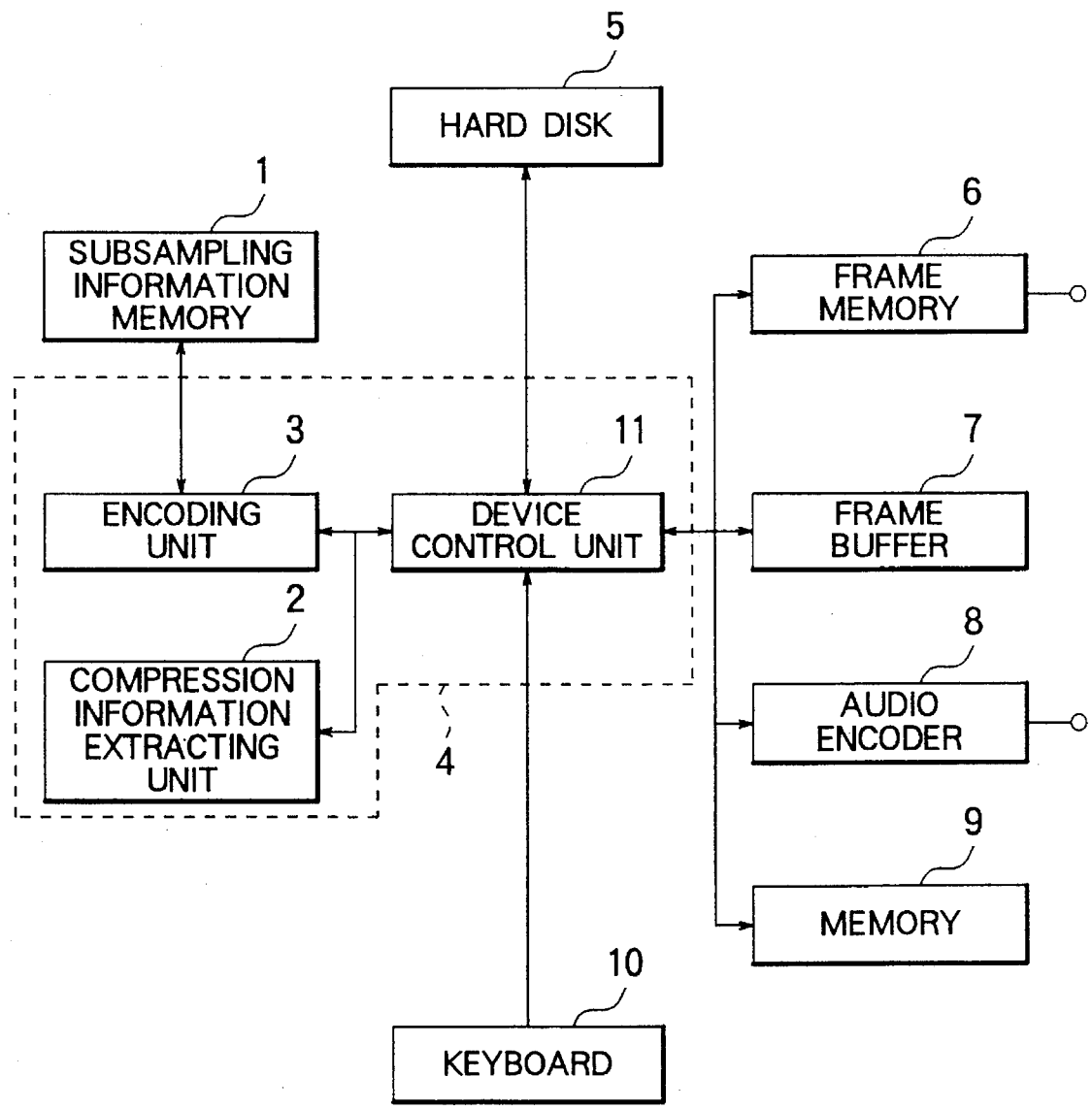
FIG. 2 shows a block diagram of a video/audio compressing device according to a first embodiment of this invention.

Now, description is made about an operation of the video/audio compressing device illustrated in FIG. 2.

An input through the keyboard 10 designates the processing of the video/audio compressing device and the control section 4 controls the whole device. A video signal retained in the frame memory 6 is separated into a luminance signal and a color difference signal to be stored in the frame buffer 7, as mentioned before and illustrated in FIG. 1(A) with respect to the conventional video/audio compressing device. A difference between the video data stored in the frame buffer 7 and the video data retained in the frame memory 7 is compression-coded by the encoding unit 3 to be stored in the memory 9. The audio data are encoded by the audio encoder 8 to be stored in the memory 9. The encoded compressed video/audio data are recorded in the hard disk 5.

In the interim, the subsampling information for each processing rate is stored in the subsampling information memory 1. By partially subsampling the color difference in accordance with an optimum subsampling operation selected from the subsampling information, recording is carried out in synchronism with the audio.

Figure 3:
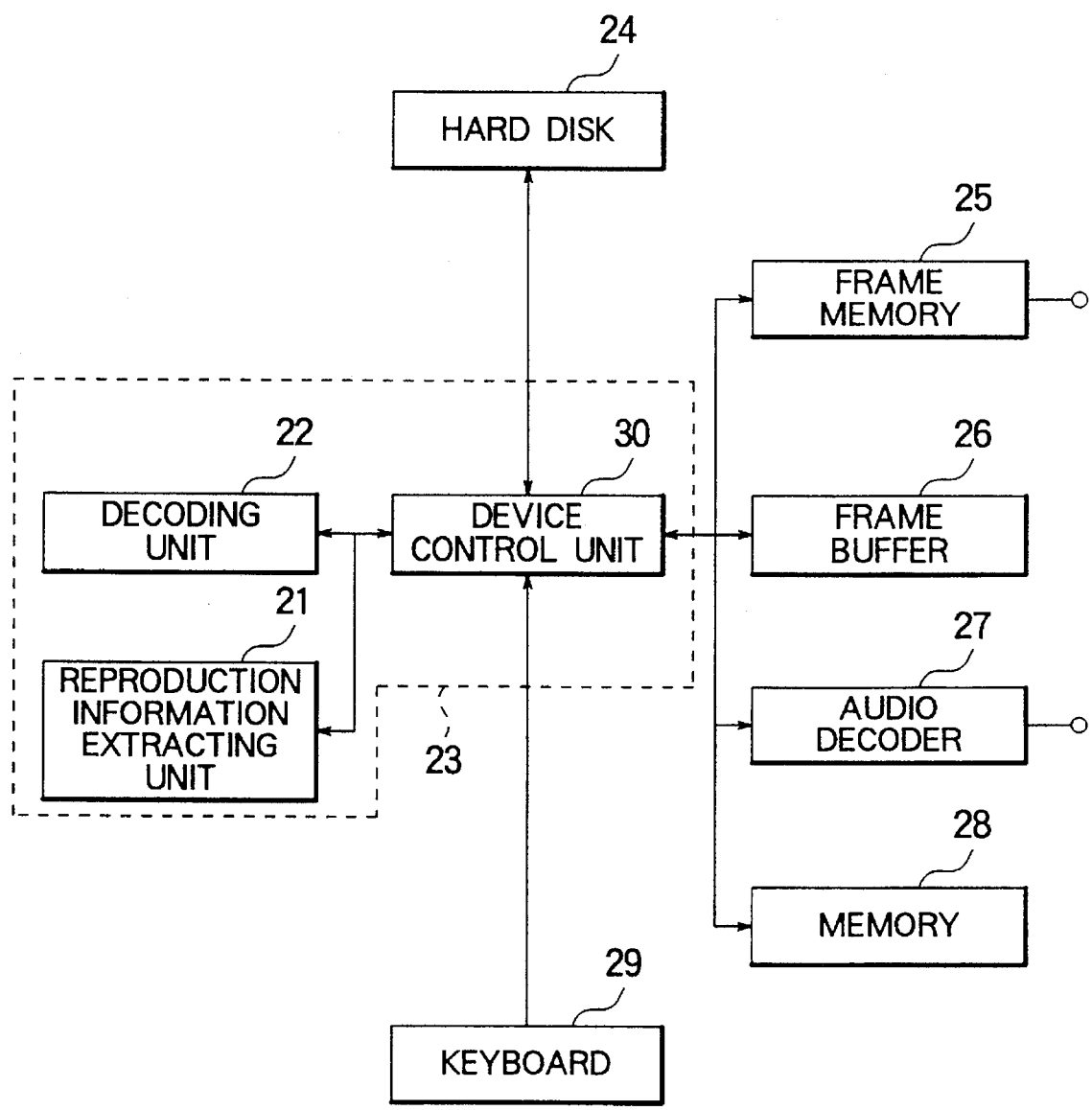
FIG. 3 shows a block diagram of a video/audio reproducing device according to the first embodiment of this invention.

Referring to FIG. 3, description will proceed to video/audio reproducing device according to the first embodiment of this invention.

The video/audio reproducing device is for use in combination with the video/audio compressing device illustrated in FIG. 2.

The video/audio reproducing device comprises a reproduction information extracting unit 21 and a decoding unit 22. The reproduction information extracting unit 21 serves as means for extracting the color difference subsampling information recorded by the video/audio compressing device from compressed video and audio codes containing the subsampling information. On the other hand, the decoding unit 22 serves as decoding means for decoding the compressed codes by interpolating the color difference in accordance with the subsampling information. The video/audio reproducing device further comprises a controls section 23, a hard disk 24, a frame memory 25, a frame buffer 26, an audio decoder 27, a memory 28, and a keyboard 29. The control section 23 comprises the above-mentioned reproduction information extracting unit 21, the decoding unit 22, and a device control unit 30.

Now, description is made about an operation of the video/audio reproducing device illustrated in FIG. 3.

An input through the keyboard 29 designates the processing of the video/audio reproducing device and the control section 23 controls the whole device. Compressed video/audio codes recorded in the hard disk 24 are read and stored in the memory 28. The compressed video code stored in the memory 28 is decoded by the decoding unit 22 and stored in the frame memory 25. A luminance signal and a color difference signal stored in the frame memory 25 are synthesized to produce a video signal. Intermediate data during calculation are stored in the frame buffer 26 as a work memory for decoding of the video data. The compressed audio code stored in the memory 28 is decoded by the audio decoder 27 to produce an audio signal. The subsampling information inserted in the compressed code is read to interpolate the color difference in accordance with the subsampling operation selected from the subsampling information. Thus, reproduction is carried out in synchronism with the audio.

Referring to FIG. 4, description is made about an example of a format of a video-audio code in the interframe difference encoding method. As illustrated in FIG. 4(A), the video-audio code comprises an SOI code representative of the start of a compressed code of a first frame (or field), a header portion (Head) of the compressed code, an audio code (Audio) of the first frame (or field), a video code (Video) of the first frame (or field), and an end code (EOI) representative of the end of the compressed code of the first frame (or field).

As illustrated in FIG. 4(B), the header portion of the compressed code comprises a size (length) of the header portion, a horizontal size (width) of the video, a vertical size (height) of the video, a frame number (frame), an effective bit number (depth) of the color difference, a horizontal addition value (addx) of the color difference, a vertical addition value (addy) of the color difference, and a line subsampling number (line) of the color difference. The subsampling information is stored in depth, addx, addy, and line of the header portion. The depth, addx and addy, and line are bit subsampling information, block subsampling information, and line subsampling information, respectively.

As illustrated in FIG. 4(C), the video code comprises a frame number (no), a key frame flag (key: 1 indicates a key frame), a color difference compression process flag (flg: 1 indicates presence of a color difference comprised code), a luminance compressed code portion (light), and a color difference compressed code portion (color: present only in case of flg=1). The subsampling information is stored in (3) in the video code. The compression process flag of 0 indicates that the color difference in that frame is subsampled.

Referring to FIG. 5, description is made about an example of the subsampling information of the video. As illustrated in FIG. 5, four subsampling information factors (parameters) are set for various levels of the number of the picture elements to be processed by the device. Specifically, the subsampling information comprises tbit (effective bit number of the color difference), tadx (horizontal addition value of the color difference), tady (vertical addition value of the color difference), tlin (line subsampling number of the color difference), and tmax (maximum average color difference). tbit, tadx and tady, tlin, and tmax are bit subsampling information, block subsampling information, line subsampling information, and frame subsampling information, respectively.

Each subsampling information is set so that video processing can be carried out within a video processing time interval of one frame required to establish synchronization with the audio. For example, it is assumed that a display process of a decoded video requires 5 milliseconds. In this event, a decoding process of one frame must be carried out within about 28 milliseconds in order to process 30 frames per second. Since the video processing time interval is proportional to the number of the picture elements, the subsampling operation is unnecessary to process the picture elements less in number than those requiring the video processing time interval not longer than 28 milliseconds. However, the subsampling operation is necessary to process the picture elements greater in number than those requiring the video processing time interval not shorter than 29 milliseconds.

In the example illustrated in FIG. 5, the subsampling operation is unnecessary when the number of the picture elements is less than 19200. When the number of the picture elements is between 19200 and 38399, the subsampling operation down to about ½ is required. When the number of the picture elements is between 38400 and 57599, the subsampling operation down to about ⅓ is required. Accordingly, when the number of the picture elements is less than 19200, the operation is carried out with the effective bit number of 8 bits, the horizontal addition value of 1, the vertical additional value of 1, the line subsampling number of 1, and the maximum average color difference of 256. When the number of the picture elements is between 19200 and 38399, the operation is carried out with the effective bit number of 8 bits, the horizontal addition value of 2, the vertical addition value of 2, the line subsampling number of 1, and the maximum average color difference of 128. When the number of the picture elements is between 38400 and 57599, the operation is carried out with the effective bit number of 4 bits, the horizontal addition value of 2, the vertical addition value of 2, the line subsampling number of 2, and the maximum average color difference of 64.

Next, each subsampling operation in this embodiment will be described.

Referring to FIG. 6, description is made as regards the color difference bit number subsampling operation. FIG. 6(A) shows original values of 8 bits while FIG. 6(B) shows those values after the bit number is reduced down to 6 bits. In the example illustrated in FIG. 6, B0 through B7 of 43H are rightwardly shifted into B2 through B7 of 10H, namely subsampled to be reduced down into 6 bits. By partially subsampling the bits as described above, the numerical values are reduced and the difference values concentrate around zero at an increased concentration ratio. As a result, the compression ratio and the reproduction rate are increased.

Referring to FIG. 7, description is made as regards the color difference block subsampling operation. FIG. 7(A) shows an original video area while FIG. 7(B) shows a video area after blocks are partially subsampled. In the example illustrated in FIG. 7, those picture elements horizontally and vertically adjacent to each other are assumed to have the same value. The sixteen picture elements A1 through A16 are subsampled to be reduced down into four picture elements A1, A3, A9, and A11. By subsampling the blocks as described above, the number of times of calculating the differences is reduced so that the compression ration and the reproduction rate are increased.

Referring to FIG. 8, description is made as regards the color difference line subsampling operation. FIG. 8(A) shows original video areas of first through third frames. FIG. 8(B) shows video areas of the first through the third frames after the lines are partially subsampled. In the example illustrated in FIG. 8, the sixteen picture elements A1 to A16 of the first frame are not subsampled at all. The sixteen picture elements B1 to B16 of the second frame are subsampled to be reduced down into eight picture elements B5 to B8 and B13 to B16 by subsampling odd lines on the assumption that the picture elements of the odd lines have the same values as those of the preceding frame. The sixteen picture elements C1 to C16 of the third frame are subsampled to be reduced down into eight picture elements C1 to C4 and C9 to C12 by subsampling even lines on the assumption that the picture elements of the even lines have the same values as those of the preceding frame. By subsampling the lines as described above, the number of times of calculating the differences is reduced so that the compression ratio and the reproduction rate are increased.

Referring to FIGS. 9(A) to 9(C), description is made as regards the color difference frame subsampling operation. FIG. 9(A) shows original video areas of first through third frames. FIG. 9(B) shows video areas after the second frame is subsampled without interpolation. FIG. 9(C) shows video areas after the second frame is subsampled with interpolation carried out. In the example illustrated in FIG. 9, the picture elements B1 to B16 of the second frame area subsampled. In case when no interpolation is carried out, use is made of the values of the picture elements A1 to A16 of the preceding frame. In case when the interpolation is carried out, use is made of calculated values (bi=Ai+(Ci−Ai)/2(i=1 to 16)) calculated from the picture elements of the preceding and the succeeding frames. By subsampling the frames as described above, the number of times of calculating the differences is reduced so that the compression ration and the reproduction rate are increased. By interpolating the subsampled frames from the preceding and the succeeding frames, video quality is so improved.

Figures 10A, 10B:
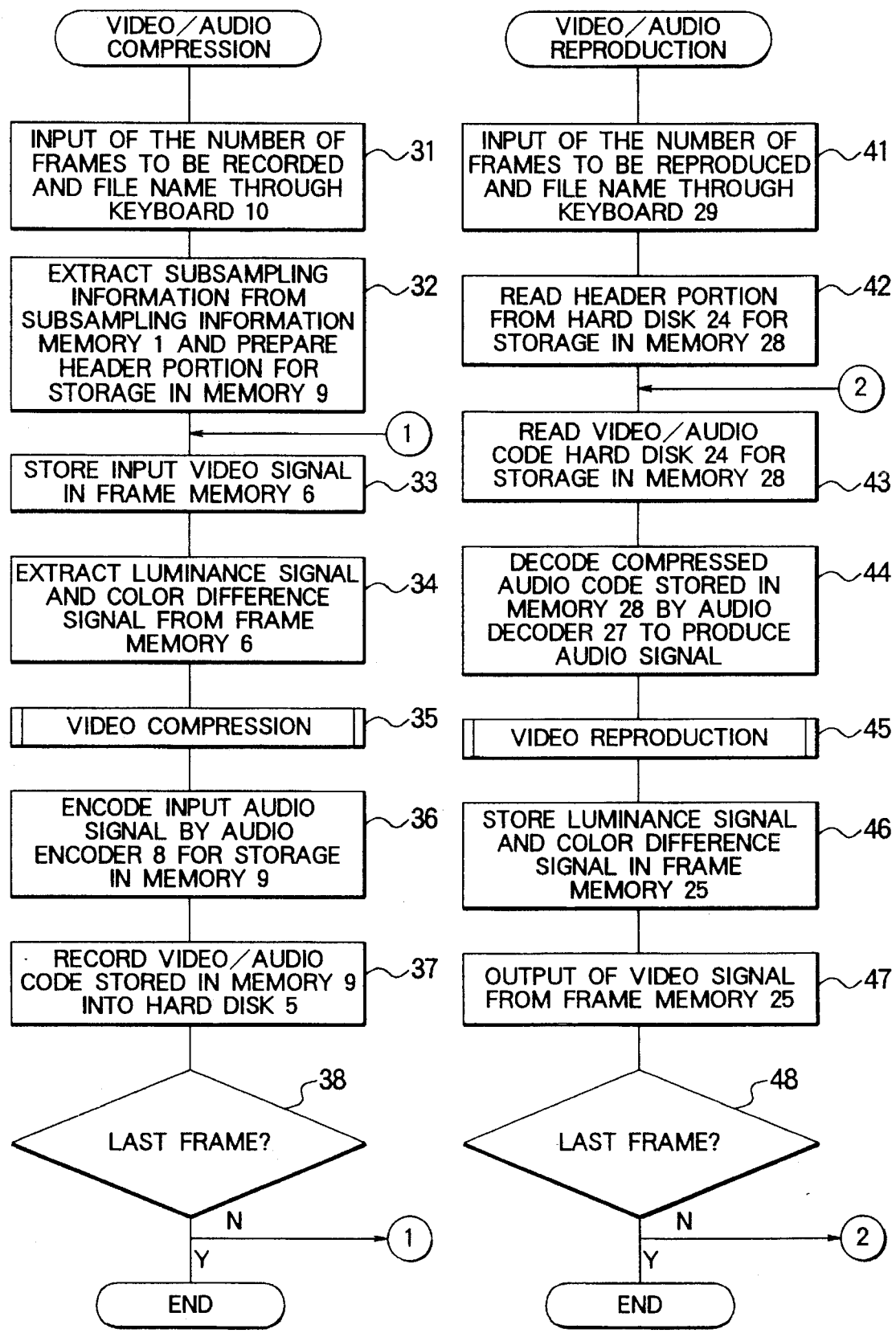
FIG. 10(A) shows a flow chart for illustrating the operation of video/audio compression in the first embodiment of this invention.
FIG. 10(B) shows a flow chart for illustrating the operation of video/audio reproduction in the first embodiment of this invention.

Referring to FIG. 10(A), description will proceed to the compression process with the above-mentioned structure. FIG. 10(A) is a flow chart for controlling compression of the video and the audio. As illustrated in the flow chart of FIG. 10(A), when the compressing device is started, the number of frames to be recorded and a file name are supplied through the keyboard 10 (Step 31). The subsampling information is extracted from the subsampling information memory 1 and the header portion is prepared and stored in the memory 9 (Step 32). An input video signal is stored in the frame memory 6 (Step 33). The luminance signal and the color difference signal are extracted from the frame memory 6 (Step 34) and subjected to video compression (Step 35). An input audio signal is encoded by the audio encoder 8 and stored in the memory 9 (Step 36). The video/audio code stored in the memory 9 is recorded in the hard disk 5 (Step 37). Then, judgement is made whether or no the last frame has been processed (Step 38). If not, the operation returns to Step 33. If affirmative, the operation comes to an end.

FIG. 10(B) is a flow chart for controlling reproduction of the video and the audio. As illustrated in the flow chart of FIG. 10(B), when the reproducing device is started, the number of the frames to be reproduced and the file name are supplied through the keyboard 29 (Step 41). The header portion is read from the hard disk 24 and stored in the memory 28 (Step 42). The video/audio code is read from the hard disk 24 and stored in the memory 28 (Step 43). The compressed audio code stored in the memory 28 is decoded by the audio decoder 27 to produce an audio signal (Step 44). The video reproduction is produced (Step 45). The luminance signal and the color difference signal are stored in the frame memory 25 (Step 46). The video signal is produced from the frame memory 25 (Step 47). Then, judgement is made whether or not the last frame has been processed (Step 48). If not, the operation returns to Step 43. If affirmative, the operation comes to an end.

FIG. 11 is a flow chart of video compression. As illustrated in the flow chart of FIG. 11, judgment is made whether or not it is a key frame (Step 51). If not, luminance compression is carried out (Step 57) and then color difference compression is carried out (Step 58). If affirmative, the luminance value of the current frame is encoded by the encoding unit 3 and stored in the memory 9 (Step 52). The luminance value of the current frame is stored in the frame buffer 7 (Step 53). The color difference value of the current frame is encoded by the encoding unit 3 and stored in the memory 9 (Step 54). The color difference value of the current frame is stored in the frame buffer 7 (Step 55). Then, judgement is made whether or not one frame is ended (Step 56). If not, the operation returns to Step 52. If affirmative, the operation comes to an end. In the luminance compression, the luminance value of the preceding frame is extracted from the frame buffer 7 (Step 61). The luminance value of the preceding frame is stored in a variable A (Step 62). The luminance value of the current frame is extracted from the frame memory 6 (Step 63). The luminance value of the current frame is stored in a variable B (Step 64). Then, a difference value (B-A) is encoded by the encoding unit 3 to be stored in the memory 9 (Step 65). The luminance value B of the current frame is stored in the frame buffer 7 (Step 66). Next, judgement is made whether or not one frame is ended (Step 67). If not, the operation returns to Step 61. If affirmative, the operation comes to an end.

Figure 12A:
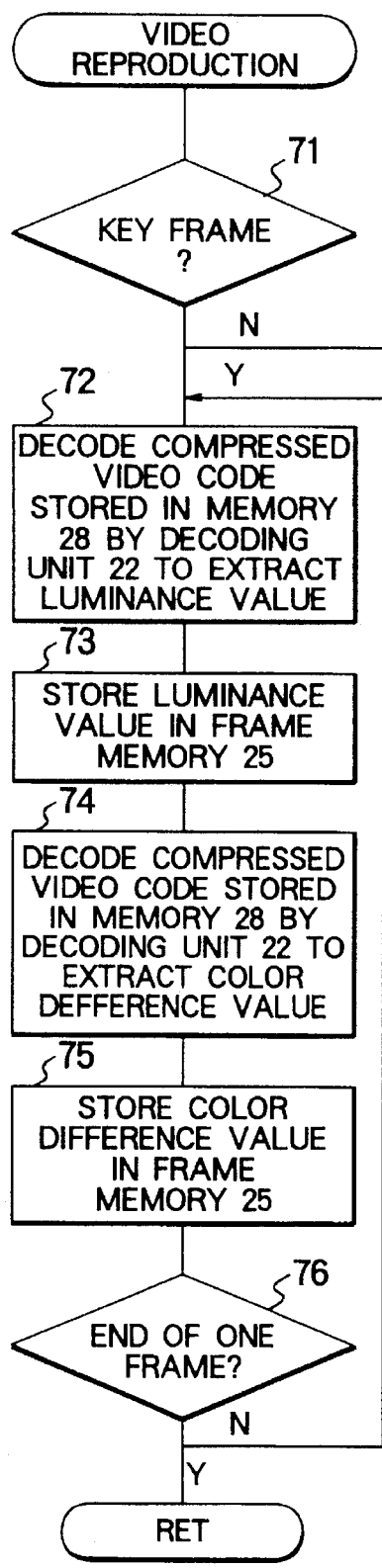
FIG. 12(A) shows a flow chart for illustrating the operation of video reproduction in the first embodiment of this invention.
Figure 12B:
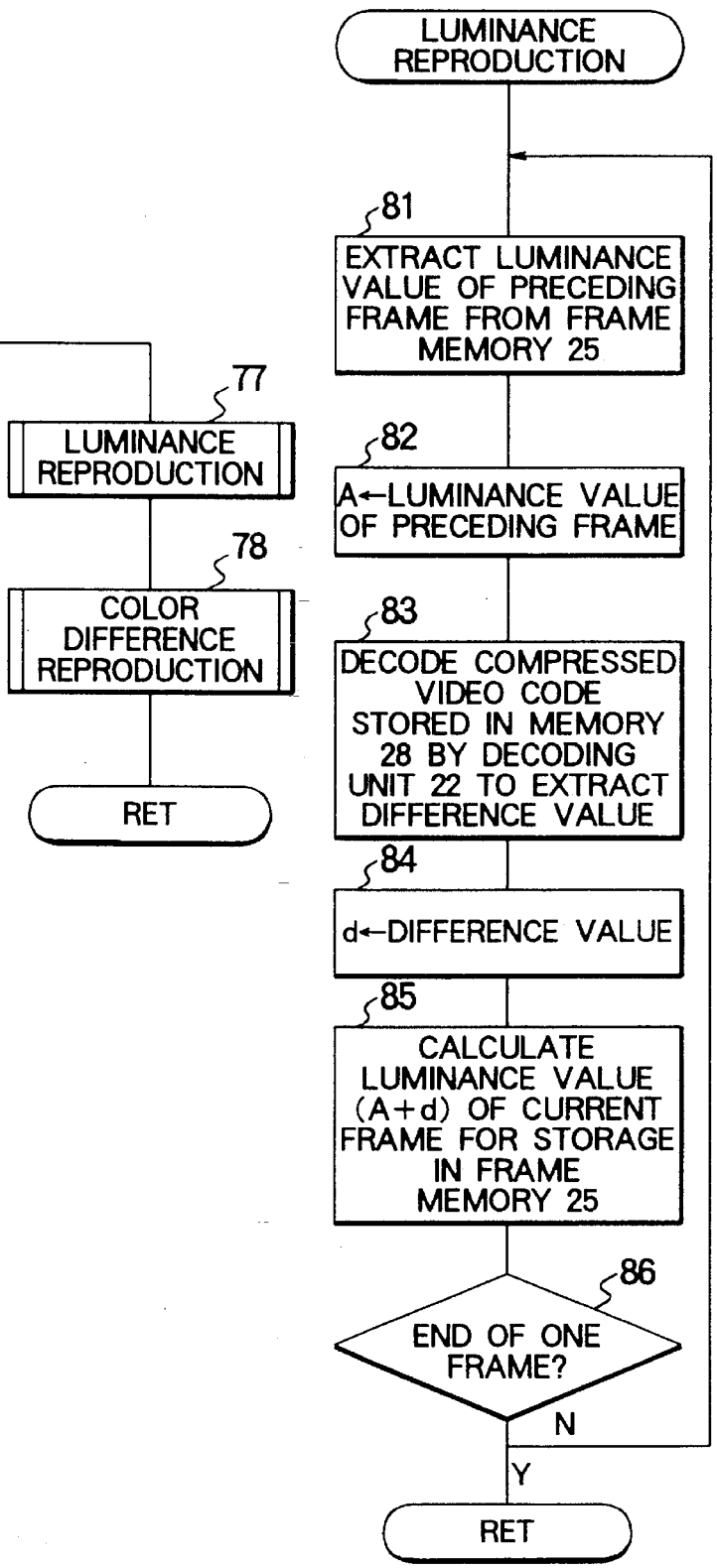
FIG. 12(B) shows a flow chart for illustrating the operation of luminance reproduction in the first embodiment of this invention.

FIG. 12 is a flow chart of video reproduction. As illustrated in the flow chart of FIG. 11, judgement is made whether or not it is a key frame (Step 71). If not, luminance reproduction is carried out (Step 77) and then color difference reproduction is carried out (Step 78). If affirmative, the compressed video code stored in the memory 28 is decoded by the decoding unit 22 and the luminance value is extracted (Step 72). The luminance value is stored in the frame memory 25 (Step 73). The compressed video code stored in the memory 28 is decoded by the decoding unit 22 and the color difference value is extracted (Step 74). The color difference value is stored in the frame memory 25 (Step 75). Next, judgement is made whether or not one frame is ended (Step 76). If not, the operation returns to Step 72. If affirmative, the operation comes to an end. In luminance reproduction, the luminance value of the preceding frame is extracted from the frame memory 25 (Step 81). The luminance value of the preceding frame is stored in the variable A (Step 82). The compressed video code stored in the memory 28 is decoded by the decoding unit 22 and the difference value is extracted (Step 83). The difference value is stored in variable d (Step 84). Then, the luminance value (A+d) of the current frame is calculated and stored in the frame memory 25 (Step 85). Next, judgement is made whether or not one frame is ended (Step 86). If not the operation returns to Step 81. If affirmative, the operation comes to an end.

Now, description will be made as regards a case where compression is carried out by the use of the color difference bit number subsampling operation, the color difference block subsampling operation, and the color difference line subsampling operation.

Figure 13:
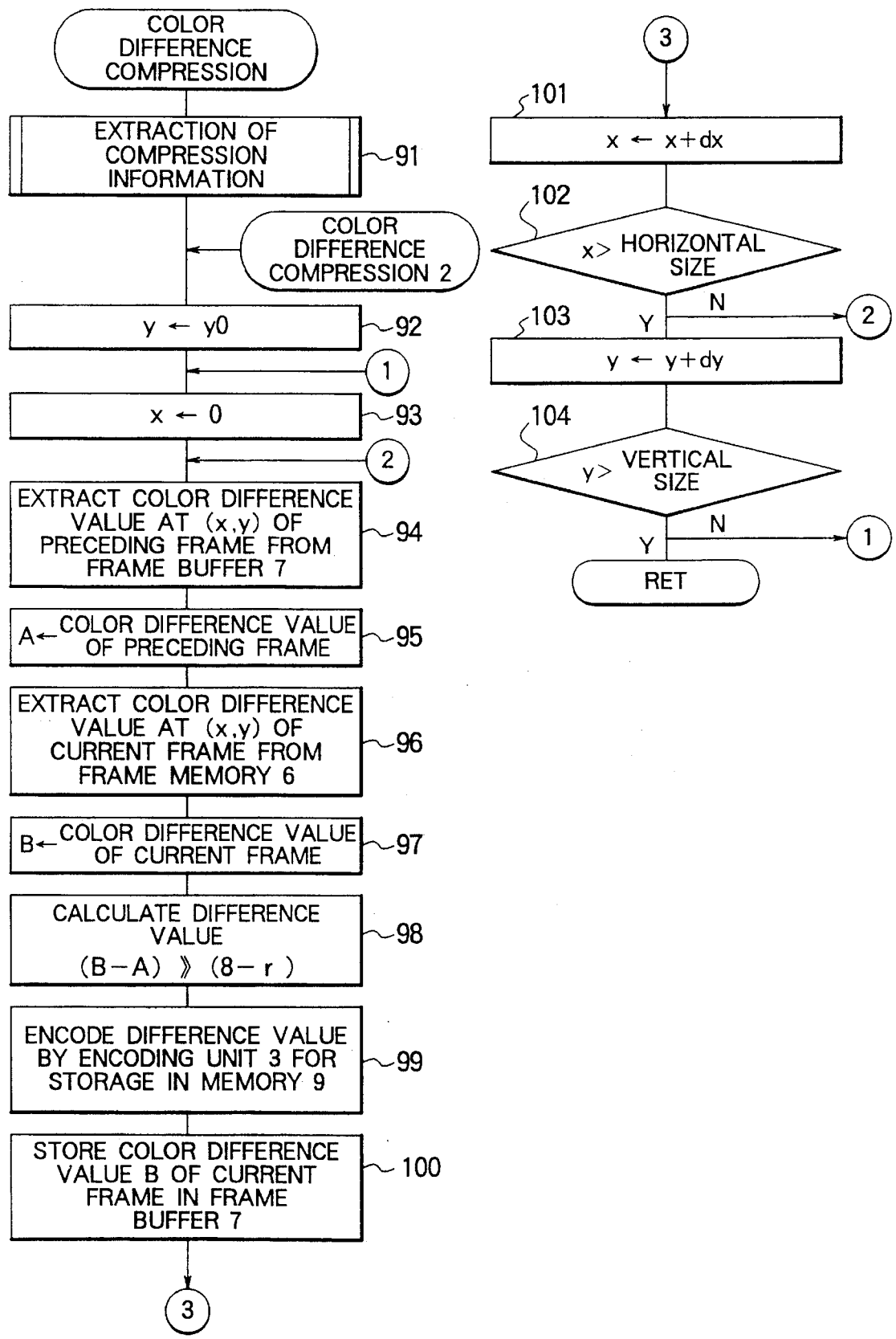
FIG. 13 shows a flow chart for illustrating the operation of color difference compression in the first embodiment of this invention.

FIG. 13 is a flow chart of color difference compression by the use of the color difference bit number subsampling operation, the color difference block subsampling operation, and the color difference line subsampling operation. As illustrated in the flow chart of FIG. 13, compression information is extracted to obtain a line start number y0, an effective bit number r, a horizontal addition value dx, and a vertical addition value dy (Step 91). Then, the line start number y0 is stored in a variable y (Step 92). Zero is stored in a variable x (Step 93). The color difference value of the picture element at a position (x, y) of the preceding frame is extracted from the frame buffer 7 (Step 94). The color difference value of the preceding frame is stored in the variable A (Step 95). The color difference value of the picture element at the position (x, y) of the current frame is extracted from the frame memory 6 (Step 96). The color difference value of the current frame is stored in the variable B (Step (97). The difference value ((B−A)>>(8−r)) of the effective bit number r is calculated (Step 98). The difference value is encoded by the encoding unit 3 and stored in the memory 9 (Step 99). The color difference value B of the current frame is stored in the frame buffer 7 (Step 100). Then, the horizontal addition value dx is added to the variable x (Step 101). Judgement is made whether or not the variable x is greater than the horizontal size of the video (Step 102). If not, the operation returns to Step 94. If affirmative, the vertical addition value dy is added to the variable y (Step 103). Judgment is made whether or not the variable y is greater than the vertical size of the video (Step 104). If not, the operation returns to Step 93. If affirmative, the operation comes to an end.

Figure 14:
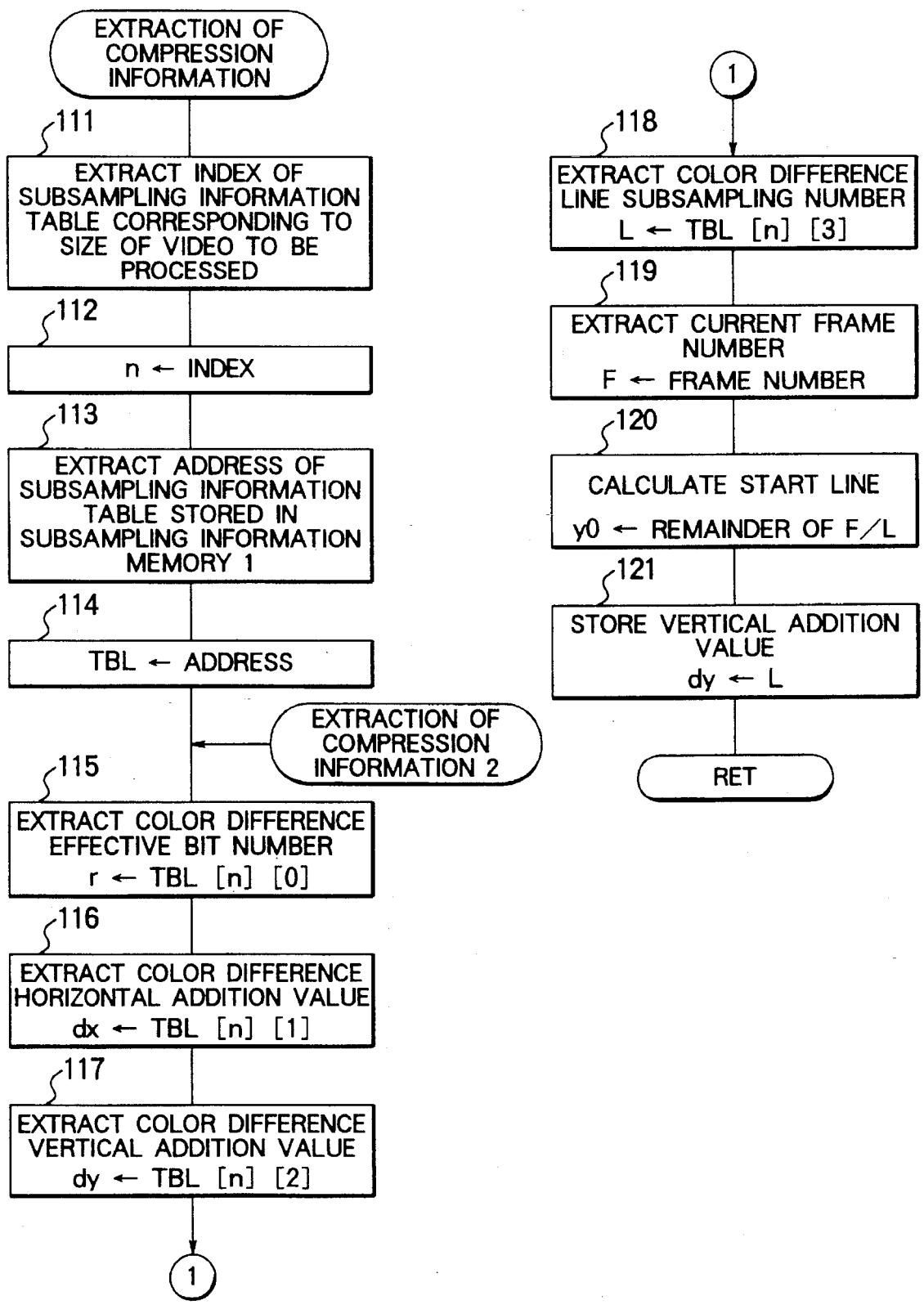
FIG. 14 shows a flow chart for illustrating the operation of extraction of compression information in the first embodiment of this invention.

FIG. 14 is a flow chart of extraction of the compression information. As illustrate in the flow chart of FIG. 14, an index of a subsampling information table is extracted in correspondence to the size of the video to be processed (Step 111). The index is stored in a variable n (Step 112). The address of the subsampling information table stored in the subsampling information memory 1 is extracted (Step 113). The address is stored in a variable TBL (Step 114). The color difference effective bit number (TBL[n][0]) is extracted and stored in a variable r (Step 115). The color difference horizontal addition value (TBL[n][1]) is extracted and stored in the variable dx (Step 116). The color difference vertical addition value (TBL[n][2]) is extracted and stored in the variable dy (Step 117). The color difference line subsampling number (TBL[n][3]) is extracted and stored in a variable L (Step 118). The frame number of the current frame is extracted and stored in a variable F (Step 119). The start line number (remainder when F is divided by L) is calculated and stored in the variable y0 (Step 120). The value of the variable L is stored in the variable dy (Step 121).

Next, description will proceed to reproduction of the compressed code obtained by the color difference bit number subsampling operation, the color difference block subsampling operation, and the color difference line subsampling operation.

Figure 15:
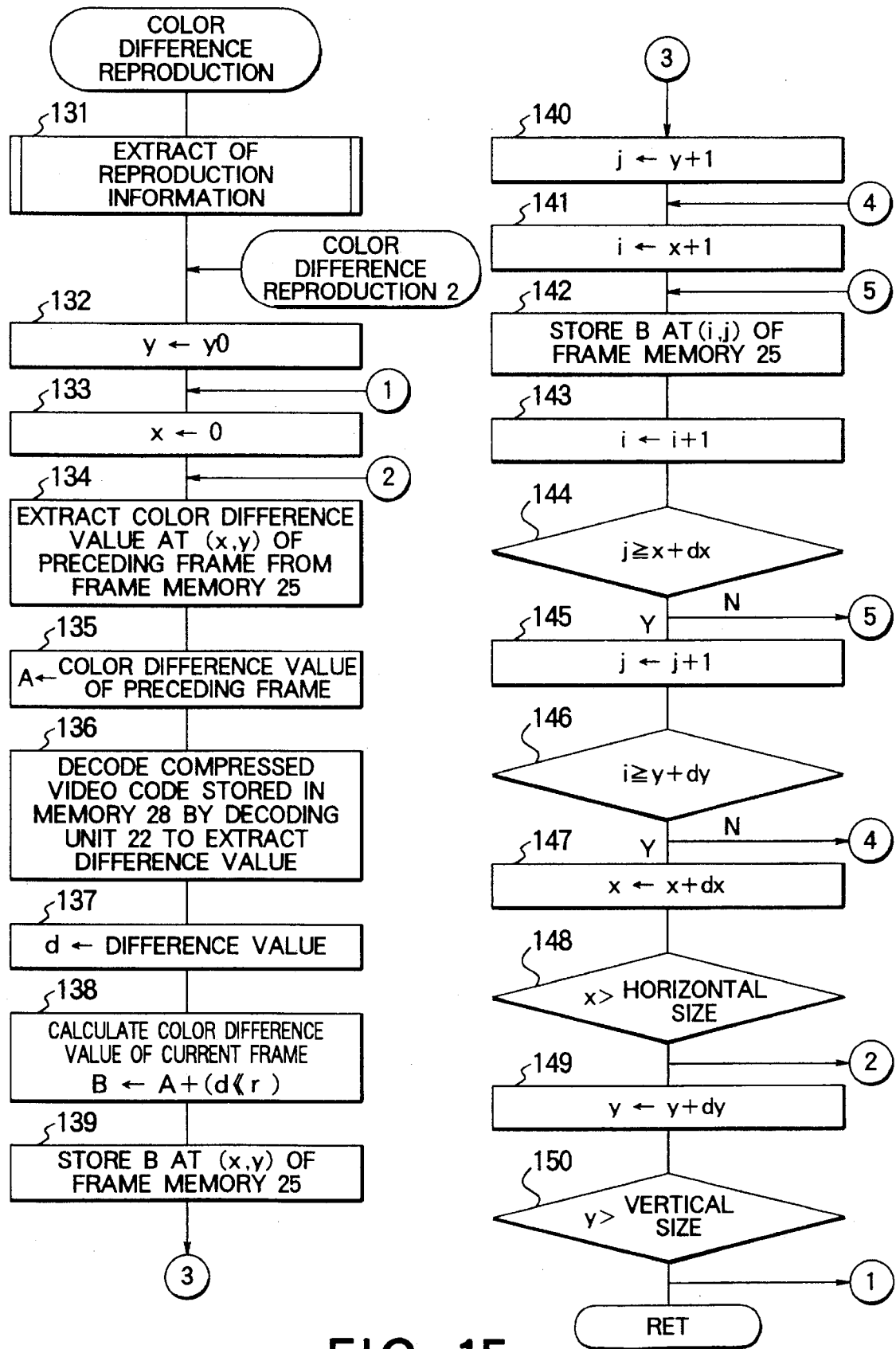
FIG. 15 shows a flow chart for illustrating the operation of color difference reproduction in the first embodiment of this invention.

FIG. 15 is a flow chart of reproduction of the compressed code obtained by the color difference bit number subsampling operation, the color difference block subsampling operation, and the color difference line subsampling operation. As illustrated in the flow chart of FIG. 15, reproduction information is extracted to obtain the line start number y0, the effective bit number r, the horizontal addition value dx, an the vertical addition value dy (Step 131). Then, the line start number y0 is stored in the variable y (Step 132). Zero is stored in the variable x (Step 133). The color difference value of the picture element at the position (x, y) of the preceding frame is extracted from the frame memory 25 (Step 134). The color difference value of the preceding frame is stored in the variable A (Step 135). The compressed video code stored in the memory 28 is decoded by the decoding unit 22 to extract the difference value (Step 136). The difference value is stored in the variable d (Step 137). The color difference value (A+(d<<r)) of the current frame is calculated from the effective bit number r and the difference value d and stored in the variable B (Step 138). The value of the variable B is stored in the color difference of the picture element at the position (x, y) of the frame memory 25 (Step 139). Then, the value y+1 is stored in a variable j (Step 140). The value x+1 is stored in a variable i (Step 141). The value of the variable B is stored in the color difference of the picture element at a position (i, j) of the frame memory 25 (Step 142). The value 1 is added to the variable i (Step 143). Judgement is made whether or not the variable i is greater than x+dx (Step 144). If not, the operation returns to Step 142. If affirmative, the value 1 is added to the variable j (Step 145). Judgement is made whether or not the variable j is greater than y+dy (Step 146). If not, the operation returns to Step 141. If affirmative, the horizontal addition value dx is added to the variable x (Step 147). Judgement is made whether or not the variable x is greater than the horizontal size of the video (Step 148). If not, the operation returns to Step 134. If affirmative, the vertical addition value dy is added to the variable y (Step 149). Judgement is made whether or not the variable y is greater than the vertical size of the video (Step 150). If not, the operation returns to Step 133. If so, the operation comes to an end.

Figure 16:
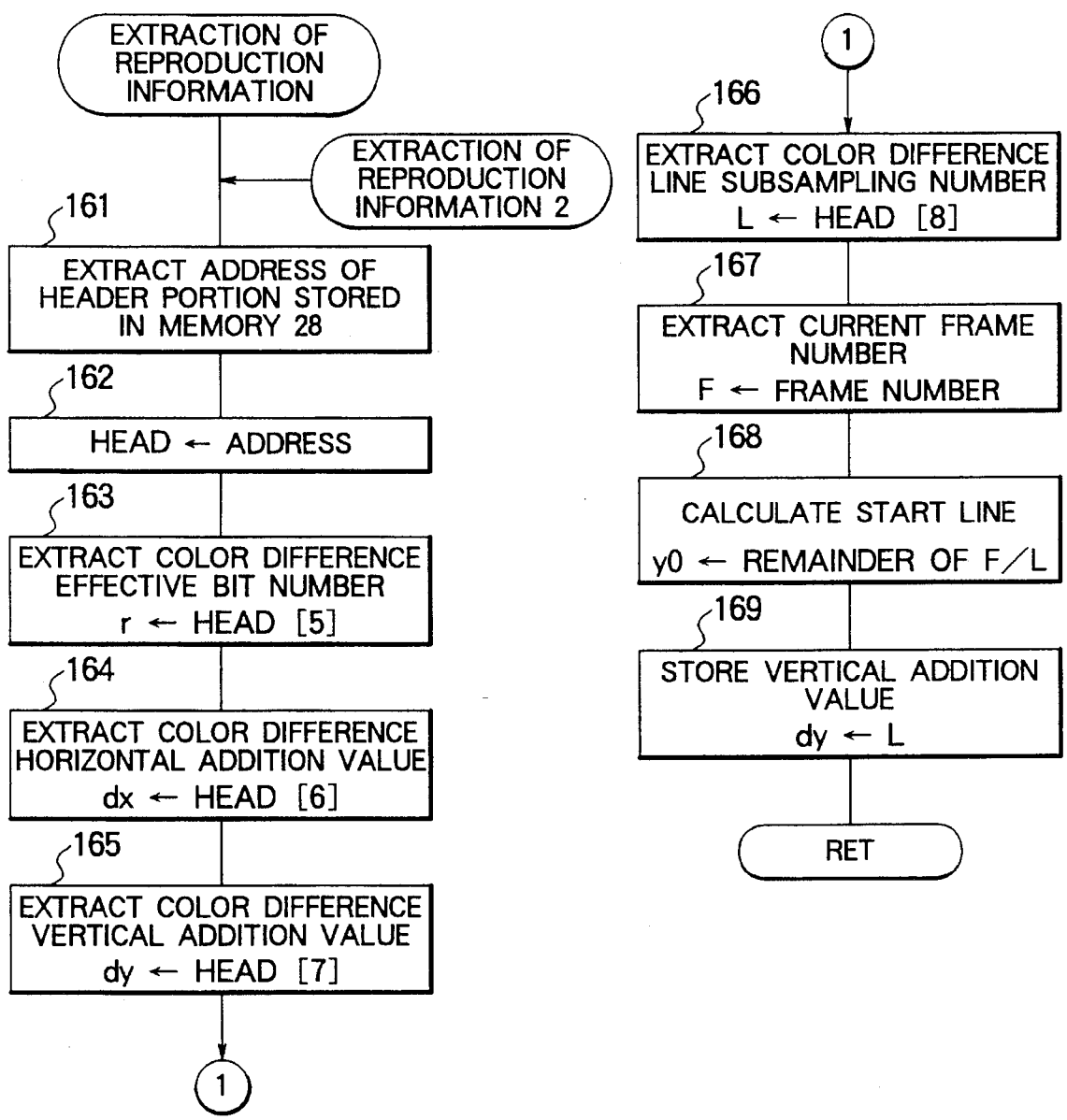
FIG. 16 shows a flow chart for illustrating the operation of extraction of reproduction information in the first embodiment of this invention.

FIG. 16 is a flow chart of extraction of reproduction information. As illustrated in the flow chart of FIG. 16, the address of the header portion stored in the memory 28 is extracted (Step 161). The address is stored in a variable HEAD (Step 162). The color difference effective bit number (HEAD[5]) is extracted and stored in the variable r (Step 163). The color difference effective bit number (HEAD[6]) is extracted and stored in the variable dx (Step 164). The color difference vertical addition value (HEAD[7]) is extracted and stored in the variable dy (Step 165). The color difference line subsampling number is extracted and stored in the variable dy (Step 166). The current frame number is extracted and stored in the variable F (Step 167). The start line number (remainder when F is divided by L) is calculated and stored in the variable y0 (Step 168). The value of the variable L is stored in the variable dy (Step 169).

Now, description will be made as regards a case where compression is carried out by the use of the color difference frame subsampling operation.

Figure 17:
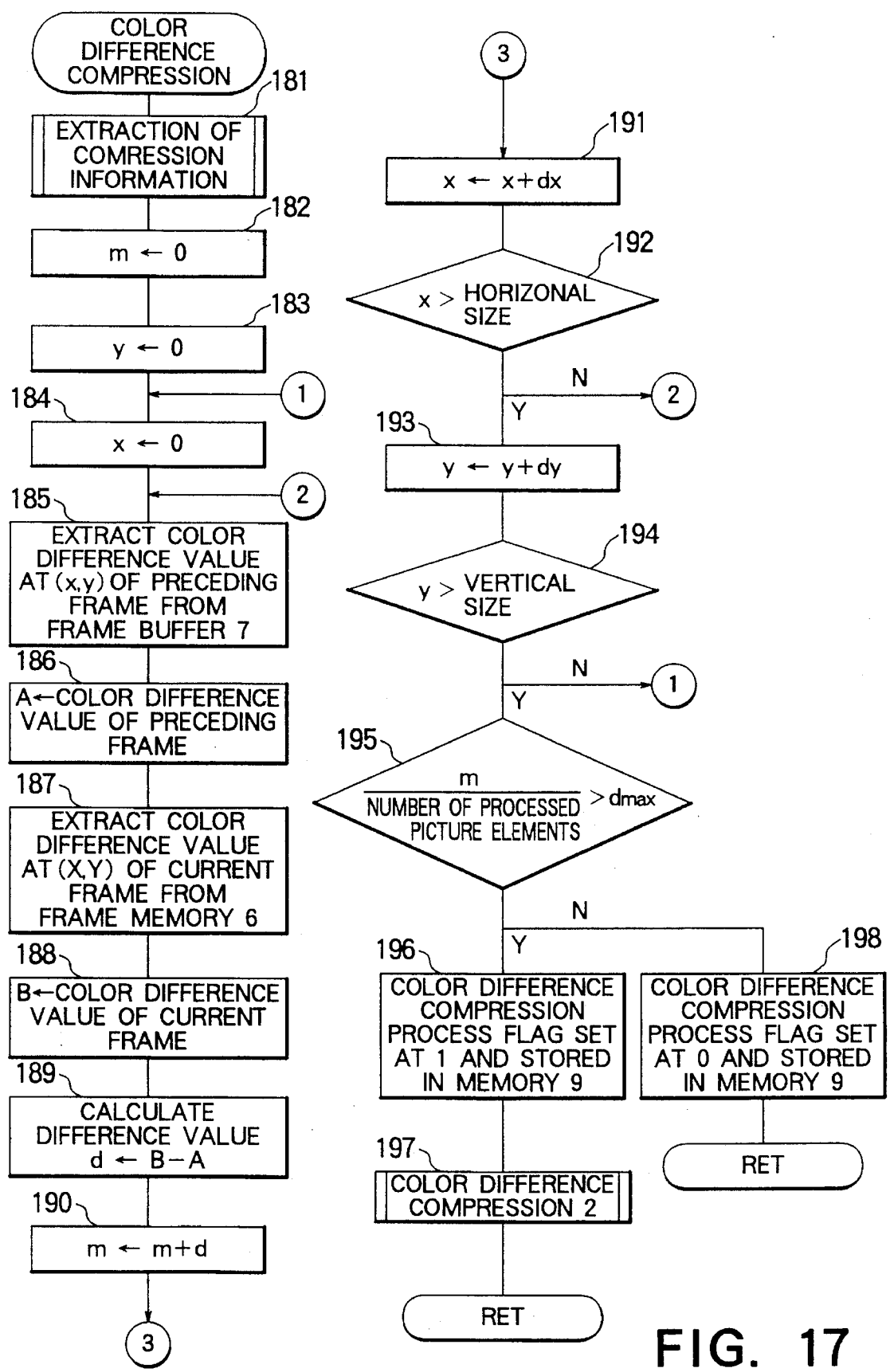
FIG. 17 shows a flow chart for illustrating the operation of color difference compression in the first embodiment of this invention.

FIG. 17 is a flow chart of color difference compression by the color difference frame subsampling operation. As illustrated in the flow chart of FIG. 17, the compression information is extracted to obtain the maximum total difference dmax, the horizontal addition value dx, and the vertical addition value dy (Step 181). Then, zero is stored in a variable m (Step 182). Zero is stored in the variable y (Step 183). Zero is stored in the variable x (Step 184). The value of the color difference of the picture element at the position (x,y) of the preceding frame is extracted from the frame buffer 7 (Step 185). The color difference value of the preceding frame is stored in the variable A (Step 186). The color difference value of the picture element at the position (x, y) of the current frame is extracted from the frame memory 6 (Step 187). The color difference of the current frame is stored in the variable B (Step 188). The difference value (B-A) is calculated and stored in the variable d (Step 189). The value of d is added to the variable m (Step 190). The horizontal addition value dx is added to the variable x (Step 191). Judgement is made whether or not the variable x is greater than the horizontal size of the video (Step 192). If not, the operation returns to Step 185. If affirmative, the vertical addition value dy is added to the variable y (Step 193). Judgement is made whether or not the variable y is greater than the vertical size of the video (Step 194). If not, the operation returns to Step 184. If affirmative, judgement is made whether or not the value obtained by dividing the variable m by the number of the picture elements to be processed is greater than dmax (Step 195). If affirmative, the color difference compression process flag is given a value of 1 and stored in the memory 9 (Step 196) and the color difference compression is carried out from Step 92 in FIG. 13. If not, the color difference compression process flag is given a value 0 and stored in the memory 9 (Step 198).

Figure 18:
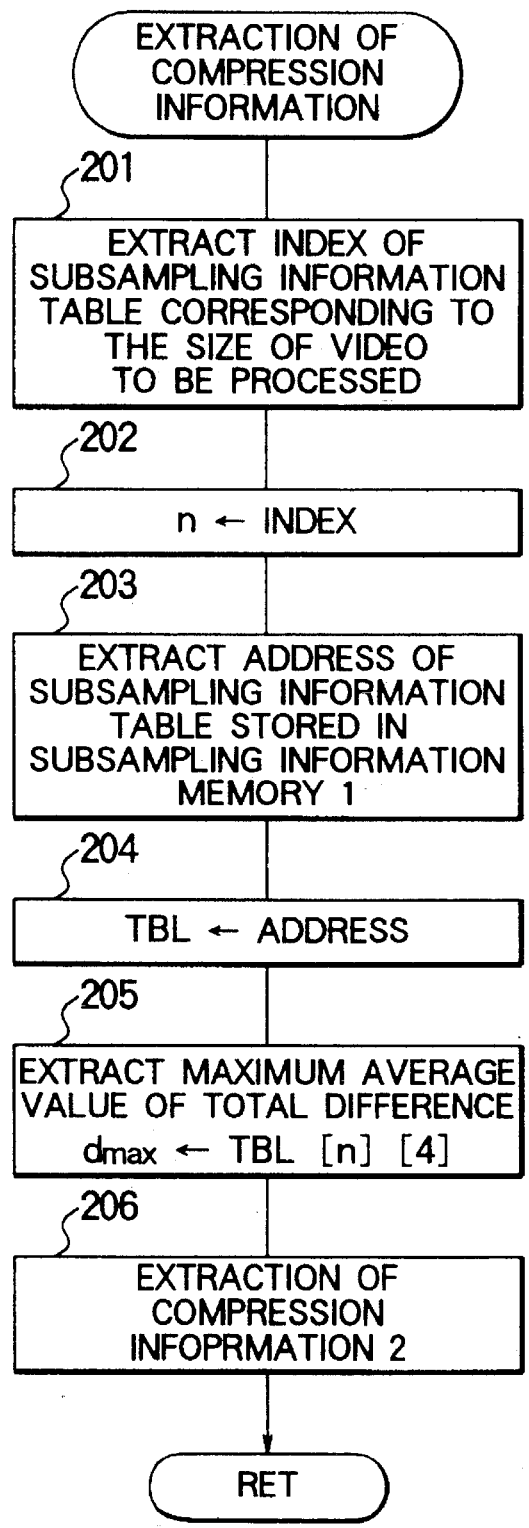
FIG. 18 shows a flow chart for illustrating the operation of extraction of compression information in the first embodiment of this invention.

FIG. 18 is a flow chart of extraction of the compression information. As illustrated in the flow chart of FIG. 18, the index of the subsampling information table is extracted in correspondence to the size of the video to be processed (Step 201). The index is stored in the variable n (Step 202). The address of the subsampling information table stored in the subsampling information memory 1 is extracted (Step 203). The address is stored in the variable TBL (Step 204). The maximum average color difference (TBL[n][4]) is extracted and stored in the variable dmax (Step 205). The compression information is extracted from Step 115 in FIG. 14.

Next, description will proceed to a case where the compressed code processed by the color difference frame subsampling operation is reproduced without interpolation.

Figure 19:
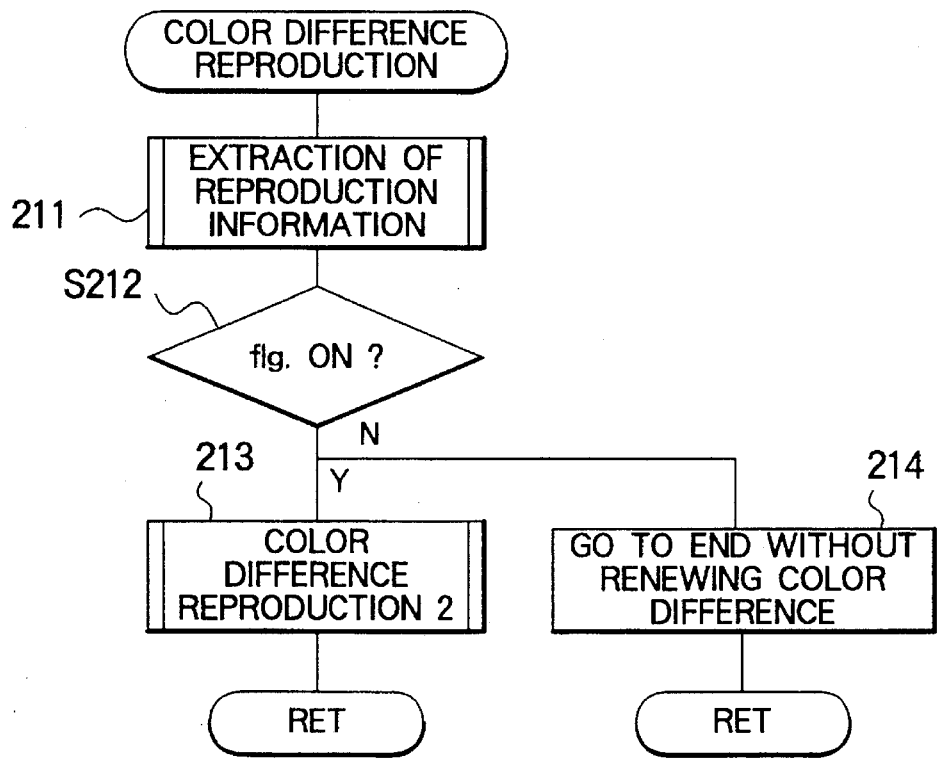
FIG. 19 shows a flow chart for illustrating the operation of color difference reproduction information in the first embodiment of this invention.

FIG. 19 is a flow chart of reproduction of the compressed code processed by the color difference frame subsampling operation. As illustrated in the flow chart of FIG. 19, the reproduction information is extracted to obtain the color difference compression process flag flg, the line start number y0, the effective bit number r, the horizontal addition value dx, and the vertical addition value dy (Step 211). Then, judgement is made whether or not the compression process flag is ON (Step 212). If affirmative, color difference reproduction is carried out from Step 132 in FIG. 15 (Step 213). If not, the operation comes to an end without renewing the color difference (Step 214).

Figure 20:
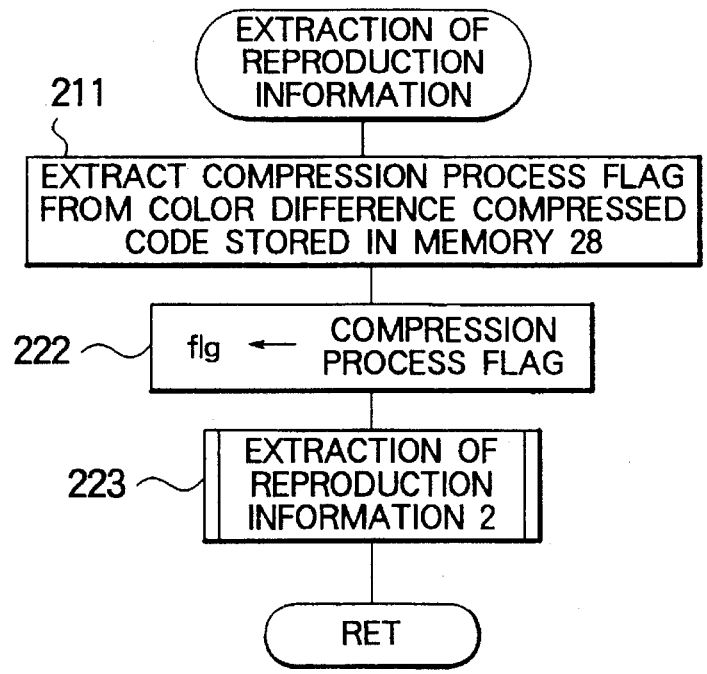
FIG. 20 shows a flow chart for illustrating the operation of extraction of reproduction information in the first embodiment of this invention.

FIG. 20 is a flow chart of extraction of the reproduction information. As illustrated in the flow chart of FIG. 20, the compression process flag is extracted from the color difference compression code stored in the memory 28 (Step 221). The compression process flag is stored in the variable flg (Step 222). The reproduction information is extracted from Step 161 in FIG. 16 (Step 223).

Now, description will proceed to a case where the compression code processed by the color difference frame subsampling operation is reproduced with interpolation.

Figure 21:
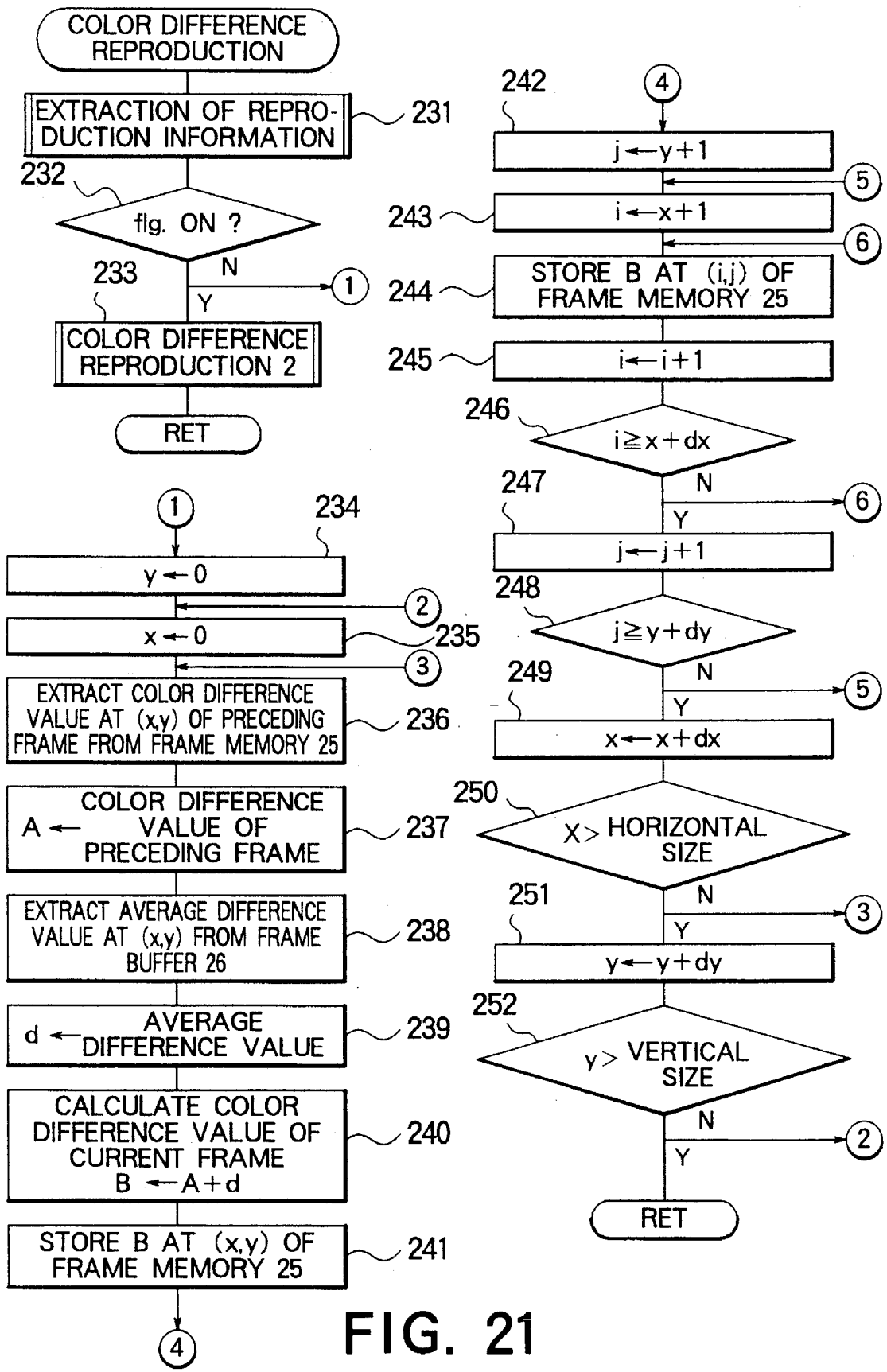
FIG. 21 shows a flow chart for illustrating the operation of color difference reproduction in the first embodiment of this invention.

FIG. 21 is a flow chart of reproduction of the compressed code processed by the color difference frame subsampling operation. As illustrated in the flow chart of FIG. 19, the reproduction information is extracted to obtain the color difference compression process flag flg, the average color difference, the line start number y0, the effective bit number r, the horizontal addition value dx, and the vertical addition value dy (Step 231). Judgement is made whether or not the compression process flag flg is ON (Step 232). If affirmative, color difference reproduction is carried out from Step 132 in FIG. 15 (Step 233). If not, zero is stored in the variable y (Step 234). Zero is stored in the variable x (Step 235). The color difference value of the picture element at the position (x, y) of the preceding frame is extracted from the frame memory 25 (Step 236). The color difference value of the preceding frame is stored in the variable A (Step 237). The average difference of the picture element at the position (x, y) is extracted from the frame buffer 26 (Step 238). The average difference is stored in the variable d (Step 239). The color difference value (A+d) of the current frame is calculated from the difference d and stored in the variable B (Step 240). The value of the variable B is stored in the color difference of the picture element at the position (x, y) of the frame memory 25 (Step 241). Then, the value y+1 is stored in the variable j (Step 242). The value x+1 is stored in the variable i (Step 243). The value of the variable B is stored in the color difference of the picture element at the position (i, j) of the frame memory 25 (Step 244). The value 1 is added to the variable i (Step 245). Judgement is made whether or not the variable i is greater than x+dx (Step 246). If not, the operation returns to Step 244. If affirmative, the value 1 is added to the variable j (Step 247). Judgement is made whether or not the variable j is greater than y+dy (Step 248). If not, the operation returns to Step 243. If affirmative, the horizontal addition value dx is added to the variable x (Step 249). Judgement is made whether or not the variable x is greater than the horizontal size of the video (Step 250). If not, the operation returns to Step 236. If affirmative, the vertical addition value dy is added to the variable y (Step 251). Judgment is made whether or not the variable y is greater than the horizontal size of the video (Step 252). If not, the operation return to Step 235. If affirmative, the operation comes to an end.

Figure 22:
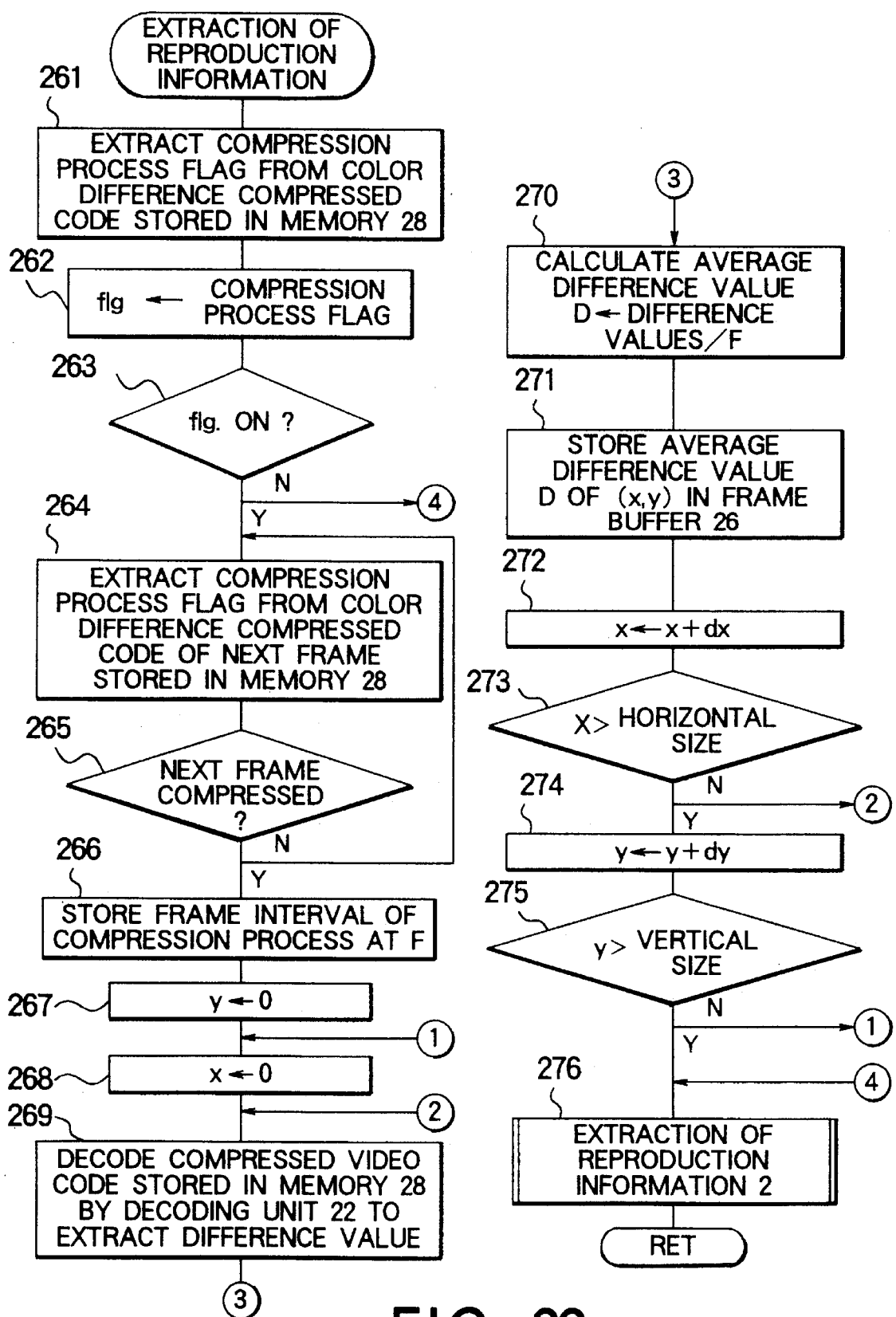
FIG. 22 shows a flow chart for illustrating the operation of extraction of reproduction information in the first embodiment of this invention.

FIG. 22 is a flow chart of extraction of the reproduction information. As illustrated in the flow chart of FIG. 22, the compression process flag is extracted from the color difference compressed code stored in the memory 28 (Step 261). The compression process flag is stored in the variable flg (Step 62). Judgment is made whether or not the compression process flag flg is ON (Step 263). If not, the operation proceeds to Step 276. If affirmative, the compression process flag is extracted from the color difference compressed code of the next frame stored in the memory 28 (Step 264). Judgment is made whether or not the next frame is subjected to the compression process (Step 265). If not, the operation returns to Step 264. If affirmative, the frame interval of the compression process is stored in the variable F (Step 266). Zero is stored in the variable y (Step 267). Zero is stored in the variable x (Step 268). The compressed video code of stored in the memory 28 is decoded by the decoding unit 22 to extract the difference (Step 269). The average difference (differences/F) is calculated and the average difference is stored in the variable d (Step 270). The value of the variable d is stored in the color difference of the picture element at the position (x, y) of the frame buffer 26 (Step 271). The horizontal addition value dx is added to the variable x (Step 272). Judgment is made whether or not the variable x is greater than the horizontal size of the video (Step 273). If not, the operation returns to Step 269. If affirmative, the vertical addition value dy is added to the variable y (Step 274). Judgement is made whether or not the variable y is greater than the vertical size of the video (Step 275). If not, the operation returns to Step 268. If affirmative, the reproduction information is extracted from Step 161 in FIG. 16 (Step 276).

Thus, in the video/audio compressing device according to the aforesaid first embodiment, the video subsampling operation is carried out in accordance with the subsampling information including a plurality of parameters. Accordingly, video compression by the frame subsampling operation can be carried out without deterioration of video quality. Therefore, it is possible to shorten the video processing time and to simultaneously record the video and the audio with synchronization established. Further, in the video/audio reproducing device according to the aforesaid first embodiment, when the video data recorded by the video/audio compressing device is reproduced, the color difference is interpolated in accordance with the subsampling information provided in the video data. Accordingly, the video processed by the frame subsampling operation can be reproduced without deterioration of video quality. This results in reduction of the video reproducing process time. It is therefore possible to prevent deterioration of video quality and to simultaneously reproduce the video and the audio with synchronization established.

Referring to FIGS. 23 to 27, description will proceed to a video/audio compressing device according to a second embodiment of this invention.

The video/audio compressing device according to the second embodiment is similar in structure to the video/audio compressing device of the first embodiment illustrated in FIG. 2. Similar parts are designated by like reference numerals.

Figure 23:
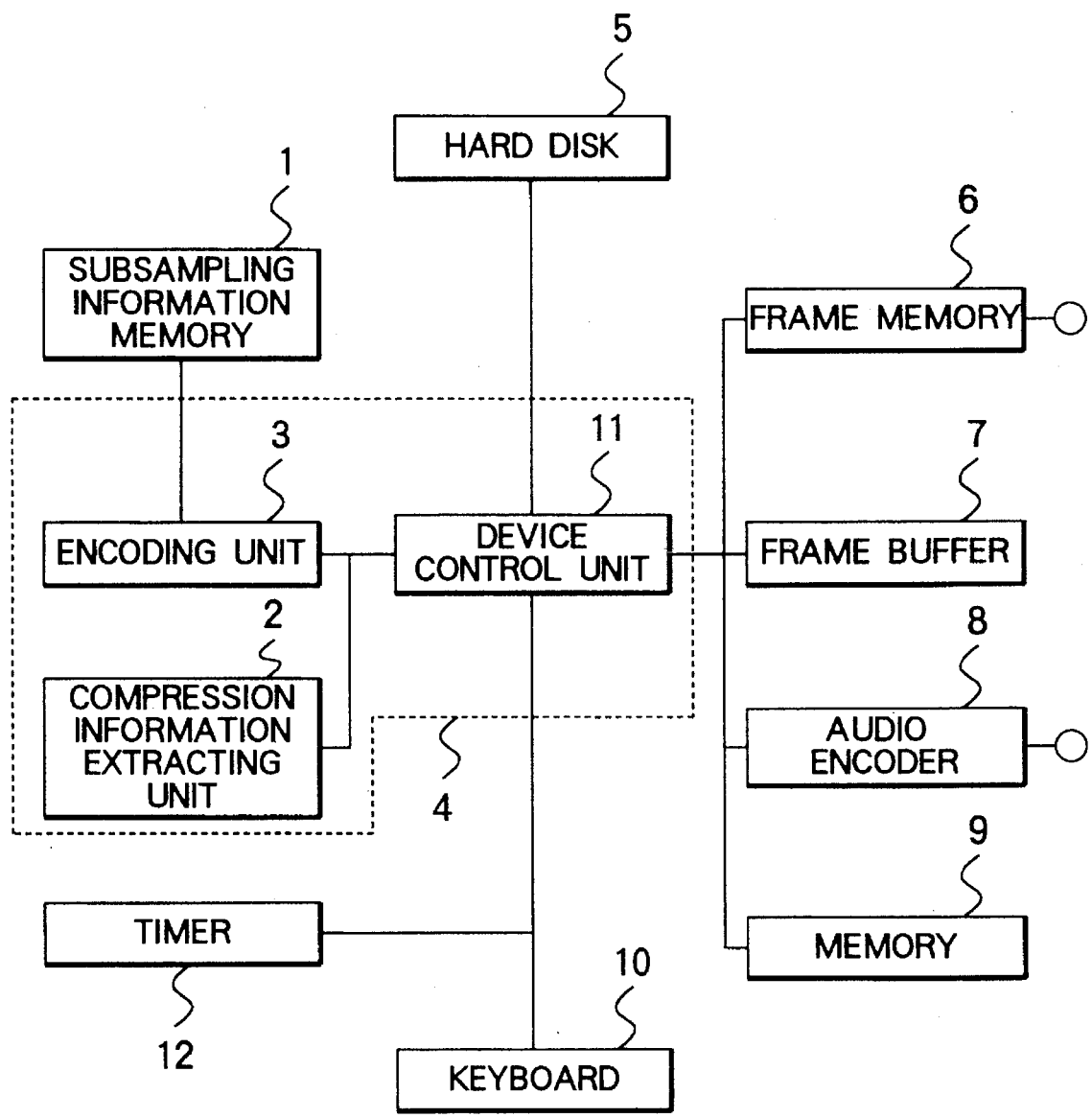
FIG. 23 shows a block diagram of a video/audio compressing device according to a second embodiment of this invention.

As illustrated in FIG. 23, the video/audio compressing device further comprises a timer 12. The timer 12 serves as reading means for reading the information amount of the video signal to be processed.

Referring to FIGS. 24(A), (B) and (C), description is made about a format of a video-audio code applied to this embodiment.

As depicted in FIG. 24(A), the video-audio code has a header portion (Head) of the compressed code in each frame.

Accordingly, it becomes possible that subsampling information varies per each flame.

Figure 25:
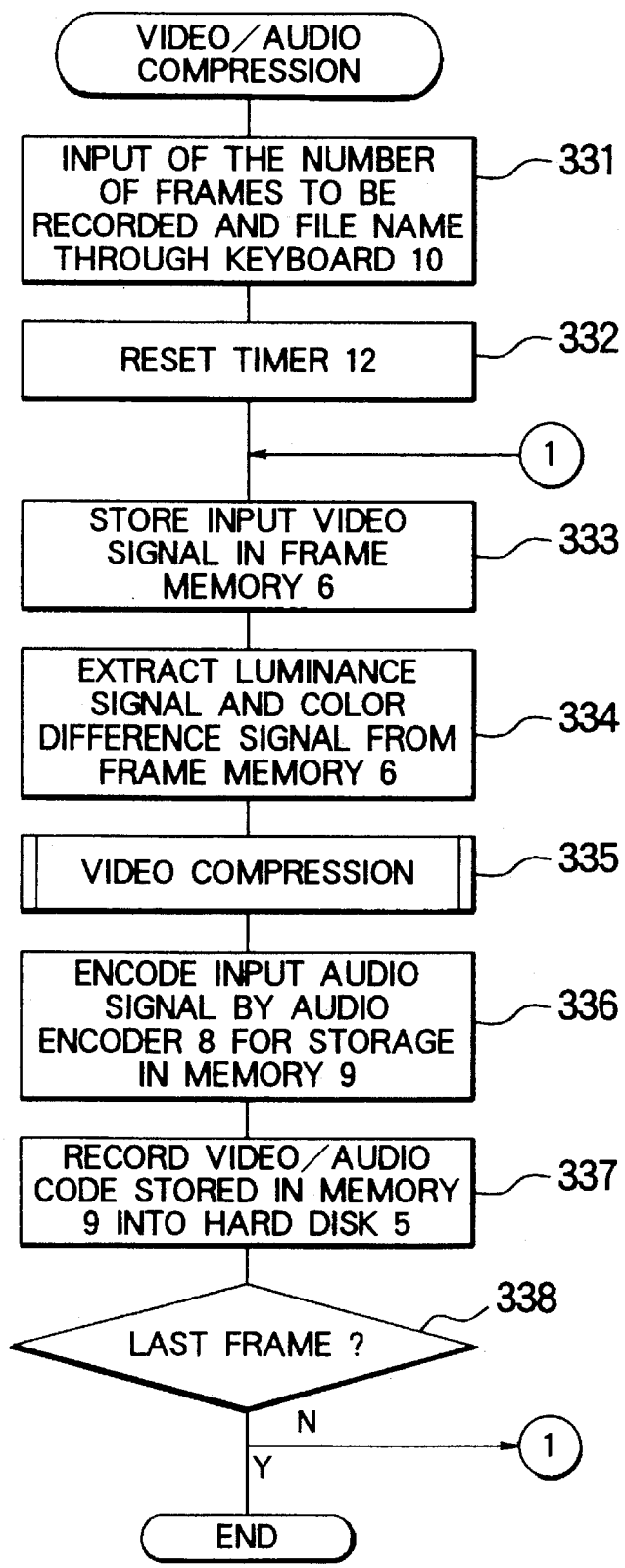
FIG. 25 shows a flow chart for illustrating the operation of video-audio compression in the second embodiment of this invention.

Referring to FIG. 25, description will proceed to the compression process with the above-mentioned structure of the video/audio compressing device according to the second embodiment of this invention.

FIG. 25 is a flow chart for controlling compression of the video and the audio. As illustrated in the flow chart of FIG. 25, when the compressing device is started, the number of frames to be recorded and a file name are supplied through the keyboard 10 (Step 331). The timer 12 is reset (Step 332). An input video signal is stored in the frame memory 6 (Step 333). The luminance signal and the color difference signal are extracted for the frame memory 6 (Step 334) and subjected to video compression (Step 335). An input audio signal is encoded by the audio encoder 8 and stored in the memory 9 (Step 336). The video/audio code stored in the memory 9 is recorded in the hard disk 5 (Step 337). Then, judgment is made whether or not the last frame has been processed (Step 338). If not, the operation returns to Step 333. If affirmative, the operation comes to an end.

Figure 26A:
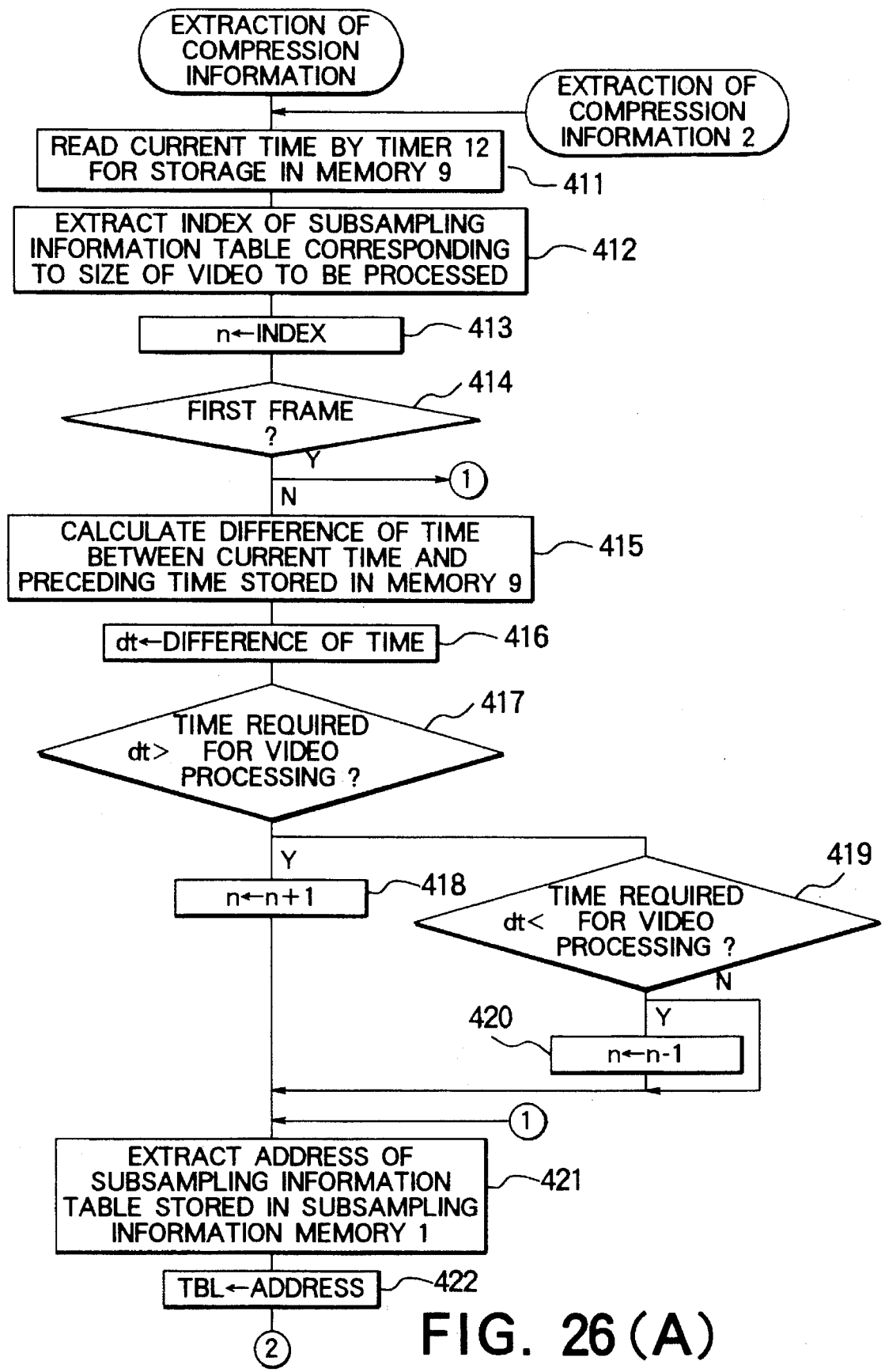
FIG. 26(A) and 26(B), drawn on two sheets, show a flow chart for illustrating the operation of extraction of compression information in the second embodiment of this invention.
Figure 26B:
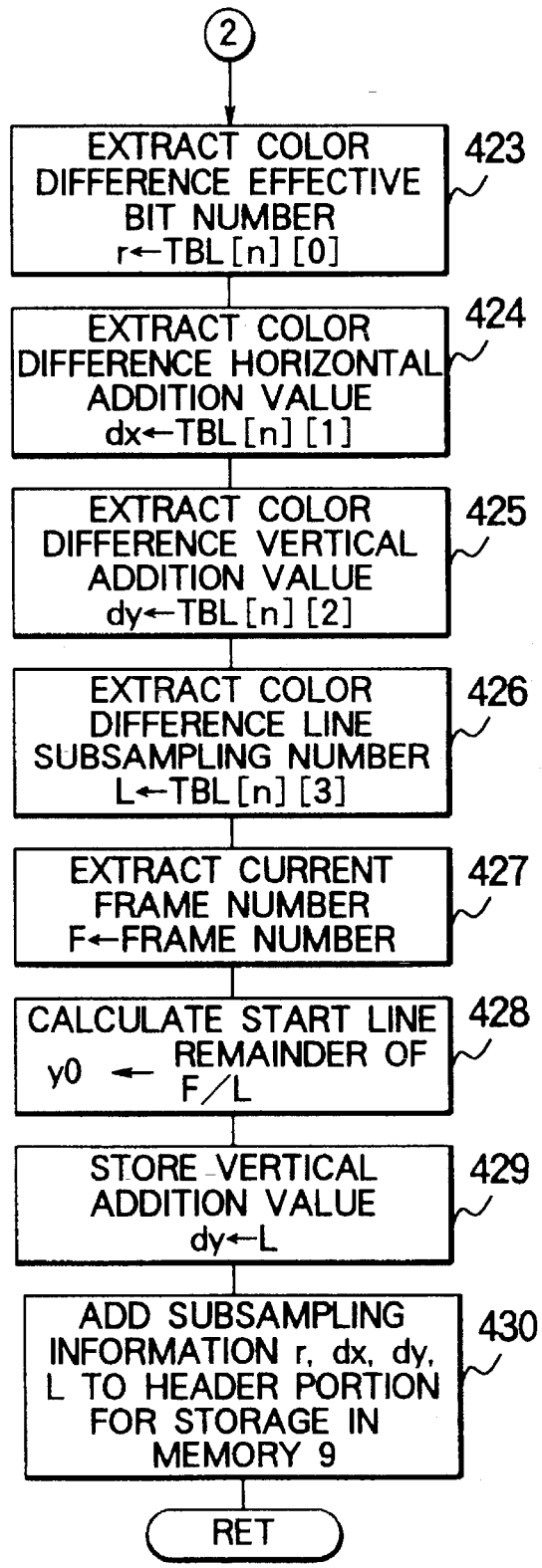

FIGS. 26(A) and 26(B) show a flow chart of extraction of the compression information operated by the video/audio compressing device according to the second embodiment of this invention.

At first referring to FIG. 26(A), a current time is read by use of the timer 12 and is stored in the memory 9 (Step 411). An index of a subsampling information table is extracted in correspondence to the size of the video to be processed (Step 412). The index is stored in a variable n (Step 413). Then, judgement is made whether or not the first frame has been processed (Step 414). If affirmative, the operation goes to Step 421. If not, a difference of time is calculated between a current time and a preceding time stored in the memory 9 (Step 415). The difference of time is stored in a variable dt (Step 416). Judgement is made whether or not the time required for video processing is smaller than dt (Step 417). If affirmative, 1 is added to the variable n (Step 418). If not, judgement is made whether or not the time required for video processing is greater than dt (Step 419). If affirmative, 1 is subtracted from the variable n (Step 418). Then, the address of the subsampling information table stored in the subsampling information memory 1 is extracted (Step 421). The address is stored in a variable TBL (Step 422). Referring in turn to FIG. 26(B), the color difference effective bit number (TBL[n][0]) is extracted and stored in a variable r (Step 423). The color difference horizontal addition value (TBL[n][1]) is extracted and stored in the variable dx (Step 424). The color difference vertical addition value (TBL[n][2]) is extracted and stored in the variable dy (Step 425). The color difference line subsampling number (TBL[n][3]) is extracted and stored in a variable L (Step 426). The frame number of the current frame is extracted and stored in a variable F (Step 427). The start line number (remainder when F is divided by L) is calculated and stored in the variable y0 (Step 428). The value of the variable L is stored in the variable dy (Step 429). The subsampling informations, r, dx, dy, and L are added to the header portion and stored in the memory 9 (Step 430). Thereby, the operation comes to an end.

Figure 27:
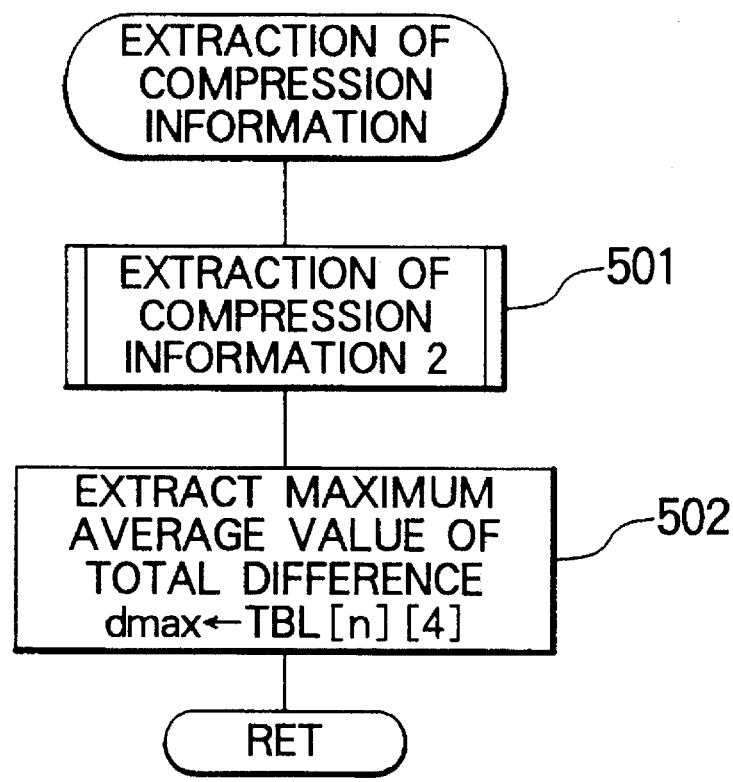
FIG. 27 shows a flow chart for illustrating the operation of extraction of compression information in the second embodiment of this invention.

FIG. 27 is a flow chart of extraction of the compression information. As illustrated in the flow chart of FIG. 27, the maximum average color difference (TBL[n][4]) is extracted and stored in the variable dmax (Step 502), after the step 501 for the extraction of compression information 2.

While this invention has thus far been described in specific conjunction with only several embodiments thereof, it will now be readily possible for one skilled in the art to put this invention into effect in various other manners. For example, in the above-described embodiments, the video is processed by the luminance and the color difference ("color difference" is equal to "chrominance" in the above-described embodiments). However, in case of processing three primary colors RGB, the similar subsampling operation may be used.

What is claimed is:

1. A video/audio compressing device for separating a video of a current frame into luminance and color difference, compression-coding an interframe difference in said luminance and said color difference between said current frame and a preceding frame, and recording a compressed video signal and a compressed audio signal in a recording medium in synchronism with each other, said compressing device comprising:

subsampling information storing means for storing color difference subsampling information predetermined in dependence upon the information amount of a video signal to be processed;

compression information extracting means for extracting said subsampling information from said subsampling information storing means; and compression-coding means for compression-coding said interframe difference by partially subsampling said color difference in accordance with said subsampling information extracted from said compression information extracting means.

2. A video/audio reproducing device for use in combination with a video/audio compressing device as claimed in claim 1, said reproducing device compressing:

means for extracting said color difference subsampling information recorded by said video/audio compressing device from compressed video and audio codes containing said subsampling information; and decoding means for decoding said compressed codes by interpolating said color difference in accordance with said subsampling information.

3. A video/audio compressing device as claimed in claim 1, wherein said subsampling information comprises color difference bit number subsampling information predetermined in dependence upon the information amount of a video signal to be processed so that said compression-coding means compression-codes said interframe difference by reducing the number of bits.

4. A video/audio compressing device as claimed in claim 1, wherein said subsampling information comprises color difference block subsampling information predetermined in dependence upon the information amount of a video signal to be processed so that said compression-coding means compression-codes said interframe difference with a block subsampling ratio increased.

5. A video/audio compressing device as claimed in claim 1, wherein said subsampling information comprises color difference line subsampling information predetermined in dependence upon the information amount of a video signal to be processed so that said compression-coding means compression-codes said interframe difference by partially subsampling color difference lines.

6. A video/audio compressing device as claimed in claim 1, wherein said interframe difference is compression-coded by partially subsampling frames with reference to judgement of a difference value of said color difference between picture elements of said current frame and said preceding frame.

7. A video/audio reproducing device for use in combination with a video/audio compressing device as claimed in claim 3, said reproducing device comprising:

means for extracting said color difference bit number subsampling information recorded by said video/audio compressing device for compressed video and audio codes containing said subsampling information; and decoding means for decoding said compressed video and audio codes by interpolating the number of color difference bits in accordance with said color difference bit number subsampling information.

8. A video/audio reproducing device for use in combination with a video/audio compressing device as claimed in claim 4, said reproducing device comprising:

means for extracting said color difference block subsampling information recorded by said video/audio compressing device from compressed video and audio codes containing said subsampling information; and decoding means for decoding said compressed video and audio codes by interpolating color difference blocks in accordance with said subsampling information.

9. A video/audio reproducing device for use in combination with a video/audio compressing device as claimed in claim 5, said reproducing device comprising:

means for extracting said color difference line subsampling information recorded by said video/audio compressing device from compressed video and audio codes containing said subsampling information; and decoding means for decoding said compressed video and audio codes by interpolating said color difference lines in accordance with said subsampling information.

10. A video/audio reproducing device for use in combination with a video/audio compressing device as claimed in claim 5, said reproducing device comprising:

means for decoding said compressed video and audio signals recorded by said video/audio compressing device by interpolating subsampled color difference lines.

11. A video/audio reproducing device as claimed in claim 6, further comprising means for decoding said compressed video and audio signals by interpolating subsampled color difference frames from color difference frames of preceding and succeeding videos.

12. A video/audio compressing device for separating a video of a current frame into luminance and color difference, compression-coding an interframe difference in said luminance and said color difference between said current frame and a preceding frame, and recording a compressed video signal and a compressed audio signal in a recording medium in synchronism with each other, said compressing device comprising;

subsampling information storing means for storing color difference subsampling information predetermined in dependence upon the information amount of a video signal to be processed;

compression information extracting means for extracting said subsampling information from said subsampling information storing means;

compression-coding means for compression-coding said interframe difference by partially subsampling said color difference in accordance with said subsampling information extracted from said compression information extracting means; and reading means for reading said information amount of said video signal to be processed.

* * * * *